United States Patent [19]

Bowers

[11] 4,034,456

[45] July 12, 1977

[54] MACHINE FOR PROVIDING BALL ENDS ON MUSICAL INSTRUMENT STRINGS

[76] Inventor: Robert H. Bowers, 2010 Douglas Ave., Kalamazoo, Mich. 49006

[21] Appl. No.: 639,799

[22] Filed: Dec. 11, 1975

[51] Int. Cl.² .......................................... B23P 19/04

[52] U.S. Cl. ................................ 29/788; 29/169.5; 29/520; 72/352; 84/297 R

[58] Field of Search ............. 29/520, 208 R, 208 E, 29/630 A, 169.5; 72/352; 59/2, 3; 24/114.5, 129 C, 115 A; 84/297 R, 199, 297 S

[56] References Cited

U.S. PATENT DOCUMENTS

| | | | |
|---|---|---|---|
| 2,535,143 | 12/1950 | Kosmis, Jr. | 84/297 S |
| 3,130,626 | 4/1964 | Martin | 84/297 S |
| 3,313,196 | 4/1967 | Mari | 84/297 S |
| 3,431,632 | 3/1969 | Wright | 29/520 |
| 3,881,236 | 5/1975 | Chaffee et al. | 29/169.5 |

*Primary Examiner*—Richard B. Lazarus
*Assistant Examiner*—Mark Rosenbaum
*Attorney, Agent, or Firm*—Blanchard, Flynn, Thiel, Boutell & Tanis

[57] ABSTRACT

Ball-ender apparatus for securing an annular ball to a wire musical instrument string. A carriage reciprocable between front and rear positions carries a rotatable ball support spindle. An upstanding ball feed tube receives a column of balls from an oscillating hopper and has retractable gating pins for dropping a ball at a time on the forward end of the ball support spindle. Wire is fed behind the ball and past a substantially L-cross-section guide plate. The length of wire fed is determined in proportion to rotation of a timing wheel. A de-reeling device leads the wire from a supply reel in a serpentine path and reduces starting tension on the wire. Upon rearward movement of the carriage, spindle and ball, which severs the fed wire length upstream of the ball and forms the wire length into a U-shape about the ball, clamp actuator cones cause clamp members to engage the legs of said wire U-shape forward of the ball tightly. Rotation of the spindle and ball then twists such wire legs together in a first twist securing the wire length to the ball. In the single twist embodiment, subsequent forward return of the spindle and carriage causes an ejector member guided on the ball feed tube to eject the interconnected ball and wire from the spindle. However, in a double twist modification, the ejection step is proceeded by engagement of lock twist jaws with the wire legs forward of the first twist area, momentary interposition of a stop in the path of carriage advancement, release of the clamp members and rotation of the spindle to form the wire legs into a lock twist. Guide rods adjacent the guide plate guide the ejected interconnected wire length and ball to a point of removal from the apparatus.

27 Claims, 21 Drawing Figures

MACHINE FOR PROVIDING BALL ENDS ON MUSICAL INSTRUMENT STRINGS

FIELD OF THE INVENTION

This invention relates to a ball-ender apparatus, and more particularly to such an apparatus for securing an annular ball to a preselected length wire with a first twist, or a first twist in combination with a lock twist.

BACKGROUND OF THE INVENTION

Wire musical instrument strings, as for banjos, guitars, etc., normally have one end terminated by a so-called ball. Such a ball normally is hollow, has a coaxial through-hole and has a substantially cylindrical outer peripheral surface with an annular groove intermediate its ends which snugly receives a loop of the wire closed by twisting of the wire immediately adjacent such loop and ball. Such ball thus forms an enlargement at the end of the wire string by which the latter can be fixed to a member on the body of the musical instrument and from which the wire extends to connect at its unballed end to a tuning key or the like at the head of the instrument.

In a prior machine for securing one end of a wire musical instrument string to a ball with a twist, the wire is fed behind the ball tangential to the groove therein, the ball is moved rearwardly from the wire path to form a U-shape around the ball, the trailing end of the wire is severed to form the short leg of the U-shape, the legs are clamped and the ball is rotated to form such twist (hereinafter referred to as a single twist), whereafter the interconnected ball and wire are ejected from the machine.

While such prior machine has for the most part been satisfactory in terms of formation of such a single twist, the present invention is the result of a continuing effort to achieve improved performance and reliability of operation of producing a ball-ended musical instrument string of desired length wherein the finished product may be provided, if desired, with an additional lock twist and/or a flattened wire cross section without recourse to transfer to or from other machines.

Accordingly, the objects of this invention include provision of:

1. A ball-ender apparatus for securing an annular ball to a wire musical instrument string rapidly and reliably.

2. Apparatus, as aforesaid, permitting friction drive wire feeding without slippage from a relatively high inertia rotative supply reel or the like by limiting wire starting and feeding tension yet preventing reel overrun when feeding stops, in which the length of wire fed is readily and reliably adjustable through relocation of the friction drive interface between a timing wheel and a rotating portion of the wire drive, and in which the wire may be subjected to flattening as it approaches the ball.

3. Apparatus, as aforesaid, which provides for reliable feeding and location of a ball adjacent the wire path and which is capable of handling ball of varius lengths.

4. Apparatus, as aforesaid, capable of forming merely a single twist or a single twist plus a lock twist, as desired, and with only a minimal amount of additional structure required for provision of the lock twist, with changeover time under 5 minutes.

5. Apparatus, as aforesaid, in which clamping of wire ends for producing the first twist is readily adjustable for differing wire diameters and varying time of occurrence of clamping action, as well as permitting close interlocation of main and twist clamping members for engaging the same wire ends to effect both types of twist in a single ball end connection.

Other objects and purposes of this invention will be apparent to persons acquainted with apparatus of this general type upon reading the following specification and inspecting the accompanying drawings.

Figure 1:
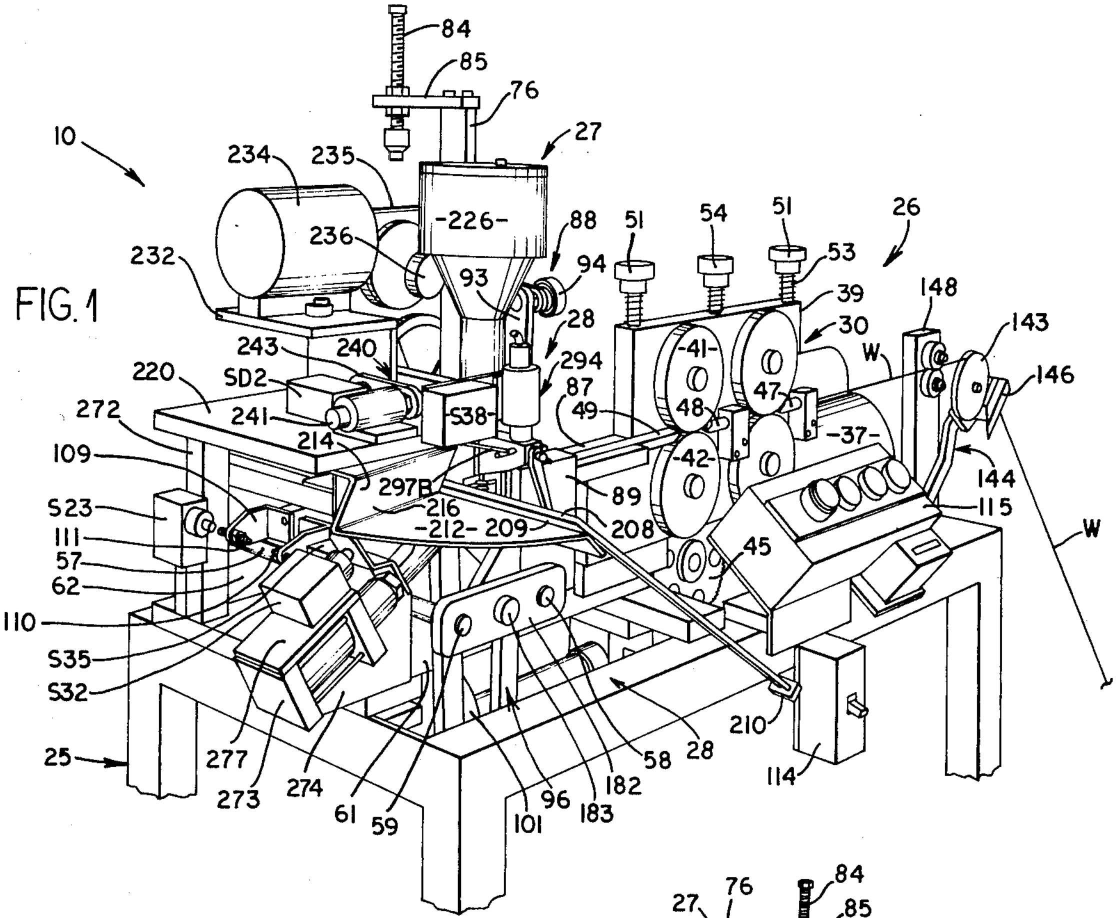
FIG. 1 is a fragmentary pictorial view, taken from the front and downstream end of a ball-ender machine embodying the invention.

Certain terminology will be used in the following description for convenience in reference only and will not be limiting. The words "up", "down", "right" and "left" will designate directions in the drawings to which reference is made. The words "front" and "rear" will refer to the sides of the machine primarily seen in FIG. 1 and 2, respectively. The word "downstream" will refer to the direction of wire feeding and the word "upstream" will refer to the opposite direction. The words "in" and "out" will refer to directions toward and away from, respectively, the geometric center of the device and designated parts thereof. Such terminology will include derivatives and words of similar import.

SUMMARY OF THE INVENTION

The objects and purposes of the invention are met by providing a ball-ender apparatus for securing an annular ball to a wire musical instrument string and having a frame. A carriage reciprocable between front and rear positions on the frame carries a rotatable ball support spindle. An upstanding ball feed tube is fixed above forward position of the ball support spindle, receives a column of balls from an oscillating hopper and has retractable gating pins for dropping balls one at a time on the forward end of the ball support spindle. Wire is fed from a rotatable supply reel or the like behind the ball and past a substantially L-cross-section guide plate and the length of wire fed is determined by a timing wheel whose rotation is adjustably proportioned to the length of wire to be fed. A de-reeling device leads the wire from the supply reel in a serpentine path and reduces starting tension on the wire through narrowing of the serpentine area and releasing a brake on the reel at the beginning of wire feeding. Upon rearward movement of the carriage, spindle and ball, which severs the fed wire length upstream of the ball and forms the wire length into a U-shape about the ball, clamp actuator cones spread adjacent ends of a pair of commonly pivoted clamp arms to engage the legs of said wire U-shape forward of the ball tightly by clamp members at the opposite ends of the clamp arms prepartory to rotation of the spindle and ball for twisting such wire legs together to form a first twist securing the wire length to the ball. In the spindle twist embodiment, subsequent forward return of the spindle and carriage causes an ejector member guided on the ball feed tube to eject the interconnected ball and wire from the spindle. However, in a double twist modification, the ejection step is preceeded by engagement of lock twist jaws with the wire legs forward of the first twist area, momentary interposition of a stop in the path of carriage advancement, release of the clamp members and rotation of the spindle to form the wire legs into a lock twist in cooperation with such lock twist jaws, whereafter the afore-mentioned ejection takes place. Guide rods adjacent the L-section guide plate receive the wire length therebetween and guide the ejected interconnected wire length and ball to a point of removal from the apparatus.

DETAILED DESCRIPTION

Figure 2:
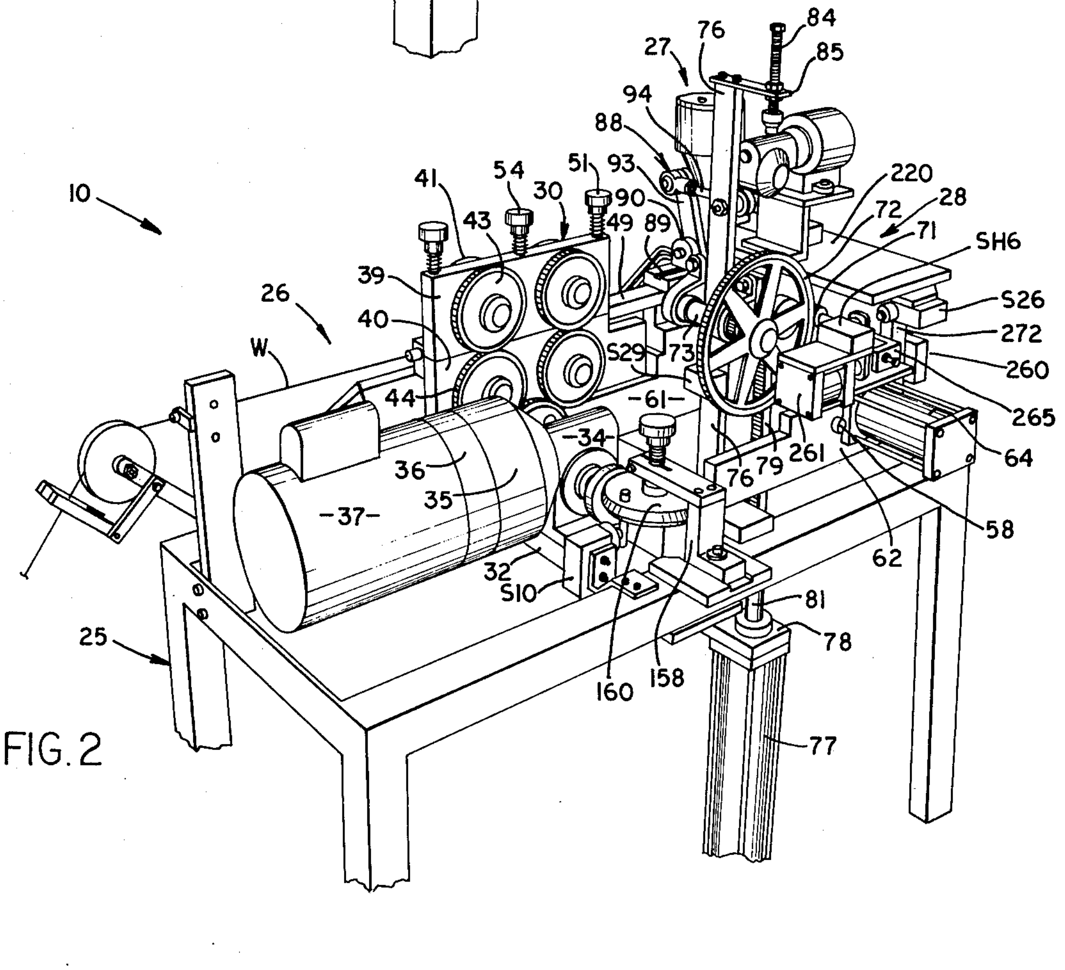
FIG. 2 is a fragmentary pictorial view of the machine of FIG. 1 taken from the rear and upstream end thereof.
Figure 13:
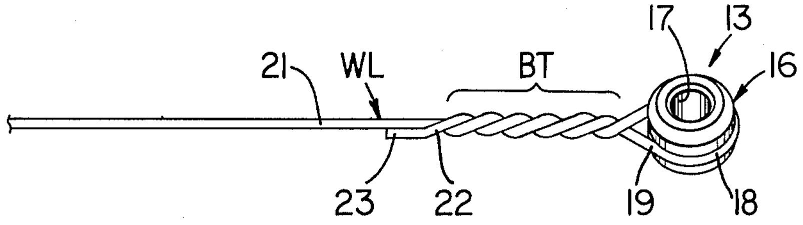
FIG. 13 is an enlarged oblique view of the balled end of a wire produced by the FIG. 1 machine operating in a single twist mode.
Figure 14:
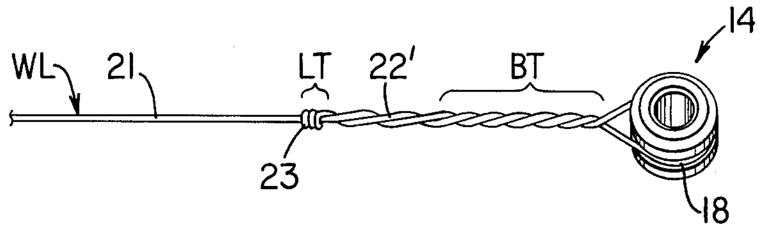
FIG. 14 is an enlarged oblique view of the balled end of a wire produced by the FIG. 1 machine in its single plus lock twist mode.

FIGS. 1 and 2 disclose a ball-ender apparatus 10 embodying the present invention and which is operable in alternative modes to produce the single twist product 13 of FIG. 13 and the single plus lock twist product 14 of FIG. 14.

The product 13, for example, comprises a substantially cylindrical member 16, termed a "ball," having a central through-opening 17 and a substantially centrally located annular groove 18 in the periphery thereof. A wire W, here shown as a single unwrapped strand, is looped at 19 snugly around the ball 16 to ride in the groove 18 thereof and has long and short legs 21 and 22 twisted around each other several times to form a single, or basic, twist BT which closes the loop 19, leaving at most a very short untwisted tail 23 on the short leg 22. The double twist product 14 is similar except that the tail 23' of short wire leg 22' is longer and extends from the basic twist BT through a short distance and then is tightly wrapped around the long wire leg 21 to form an axially compact lock twist LT of a few (here three) turns.

The apparatus 10 includes an upstanding substantially rectilinear frame 25 (FIGS. 1 and 2). In general, the upstream (rightward in FIG. 1) portion of the frame 25 supports a wire feeding portion 26 of the apparatus and the downstram (leftward in FIG. 1) portion of the frame supports the ball feeding and twist portions of the apparatus, generally indicated at 27 and 28, respectively.

The wire feed 26 includes a wire drive system 30 by which wire W is advanced from a source supported off the rightward end of the machine (and hereinafter discussed with respect to FIG. 4) upwardly and then substantially horizontally along the front portion of the machine to and beyond the left (FIG. 1) end thereof. The wire drive system 30 includes a fore-aft cross member 32 spanning the upper rails of the frame 25 and supporting motor means including a right angle drive gear unit 34 integrated with a magnetic brake 35, magnetic clutch 36 and electric motor 37.

Stacked upper and lower support plates 39, 40 are carried on the frame 25. Two sets of upper and lower drive wheels 41 and 42 rotatably supported by the plates 39 and 40 are coshafted with and rotatably driven by corresponding gears 33 and 34 behind the plates 39 and 40. Such gears are in turn rotatably driven through a further gear 45 by the angle drive 34. Guides 47, 48 and 49 (FIG. 1) guide the wire W between the upper wheels 41 and lower wheels 42 which frictionally engage same for downstream (to the left in FIG. 1) advancement. Hand screws 51 connect the upper and lower plates 39 and 40 and adjust to vary the compression of corresponding springs 53 and thereby vary the force of the upper and lower wheels 41 and 42 on the wire W therebetween. Intermediate hand screw 54 adjusts to lift the upper wheels 41 away from the lower wheels 42 to facilitate threading of the wire W through the guides 47–49.

The twist portion 28 of the apparatus includes a carriage 57 (FIGS. 1, 3 and 10) slidable forwardly and rearwardly on horizontally opposed fore-aft extending shafts 58 and 59, preferably by linear bearings not shown. Heavy platelike support members 61 and 62 (FIG. 2) are rigidly supported at the top of the frame 25 in front of and behind the carriage 57 and rigidly support the shafts 58 and 59 for reciprocation of the carriage 57 therebetween. The support member 61 extends upstream to connect lower drive support plate 44 to frame cross member 32. A pressure fluid cylinder 64, hereafter referred to as the spindle cylinder, is fixed to the bakc of rear support 62 and has a piston rod extending forward into fixed engagement with the carriage 57 for forward-rearward reciprocation thereof.

A spindle 66 (FIG. 3) extends forwardly through the upper portion of carriage 57 above the axis of spindle cylinder 64. The carriage 57 has suitable bearings which rotatably support the spindle 66. The forward end 67 (FIGS. 8 and 9) of spindle 66 is recessed to provide a chordal step carrying a tapered, diametrally arranged pin 68 for receiving a ball 16 thereon as hereafter discussed. In its forwardmost position, the front end 67 of shaft 66 is located such that the path of wire W is between the rear face of a ball 16 on pin 68 and the forwardly facing area of step 69, seen in FIGS. 3 and 8A.

A pinion gear 71 (FIG. 3) fixed to the rear end of spindle 66 is driven by a large gear 72 fixed to a forwardly extending countershaft 73 rotatably supported by bearings 74 fixed to the upstream side of carriage 57. A vertical post 76 is also fixed to the upstream side of carriage 57 and extends both above and below same, here between the bearings 74. A vertically oriented pressure fluid cylinder 77 (FIG. 2), hereafter referred to as the rack cylinder, fixedly depends from a bracket 78 fixed to and rearwardly extending from the lower end of post 76. The rack cylinder 77 is thus offset below the carriage 57 but moves fore and aft therewith. A vertical rack 79 (FIGS. 2 and 3) is fixed atop the piston rod 81 of rack cylinder 77. The rack 79 drivingly engages a pinion 82 fixed to countershaft 73 for rotating same. A roller 83 (FIG. 3) rotatably supported on the back of carriage 57 backs the rack 79 to maintain same vertically movable and in driving engagement with pinion 82. Thus, the spindle 66 is rotatably drivable in one direction or the other by corresponding actuation of rack cylinder 77.

For use in the single twist mode of the apparatus, a vertically adjustable limit screw 84 (FIGS. 1 and 2) is aligned above the rack 79 and threadedly supported by a rearwardly extending bracket 85 fixed to the top of post 76. By limiting the upward travel of the rack at a preselected height, the limit screw 84 determines the number of twist imparting revolutions of spindle 66 and hence the number of wraps in the basic twist BT of FIG. 13.

The shearing unit 88 (FIGS. 1, 2 and 3) is arranged along the path of the wire W adjacent and upstream of the spindle 66 for severing the short leg 23, 23′ (FIGS. 13 and 14) from the upstream portion of the wire in guide 49. In the embodiment shown, the guide 49 (FIG. 16A) comprises abutting front and rear members (one grooved to receive the wire W) flushly seated in an upward facing channel member 87 in turn fixed atop the frame-mounted support 61 by any convenient means. The shearing unit 88 includes a fixed L-section shear block 89 fixed by screws 92 to the front and top of channel 87 atop guide 49. An upstanding ear 90 is fixed atop the downstream end of block 89. Preferably, the downstream end of front guide member 49 has a carbide shear plate 91 recessed therein in front of the wire. Set screws 86 in the front of channel member 87 fix the guide 49 therein. By loosening screws 86, the guide members 89 are adjustable along the wire. The movable part of the shearing unit 88 comprises a generally upstanding lever 93 pivoted intermediate its ends on the downstream side of ear 90 and having a lower end behind the wire and preferably provided with a hardened shearing edge (as by means of a carbide insert, seen at 93A). An adjustable length connecting rod 94 has ends swivelly connected by ball joints to the upper end of lever arm 93 to the post 76 mounted on carriage 57. Thus, rearward movement of carriage 57 swings the lower arm of shear lever 93 forward along the downstream face of shear plate 91 to shear the wire W at a preselected distance upstream from the spindle 66, thus separating a length of wire WL from the intermediate length wire W in and extending upstream from the guide 49. The ball joint end terminations and adjustable length of rod 94 permit correct shear operation despite adjustive relocation of the guide members 49 along the wire W.

A main clip unit 96 (FIGS. 1, 3, 10 and 15) includes horizontally opposed clamp members 97 flanking the axis of the spindle 46 immediately behind the path of the wire W. The clamp members are supported on the upper ends of opposed pivoted arms 99 and 100 and open and close in response to rotation of a camming disk 101 rotatably supported by a shaft 102 supported generally below and parallel to the path of the wire W by suitable bracketing fixed to the frame 25. A connecting rod 104 is of adjustable length and provided with ball joints at its ends for connection to the upper edge portion of disk 101 and to a member 105 depending fixedly from the rear face of carriage 57. By adjusting the length of connecting rod 104, clamp members 97 close on the legs 21 and 22 of the severed wire length WL at a predetermined point in the rearward movement of the carriage 57, spindle 66 and ball 16 supported thereby.

Vertically offset limit switches SH2 and S41 (FIG. 15) are fixed respectively to a pendant part 105 of frame 25 and post 76 for actuation by actuator bars 107 and 108 fixed to and extending horizonally from the lower portion of rack 79. Further limit switches S23 and S35 (FIGS. 1 and 3) are fixedly supported with respect to the frame 25 in foreaft offset relation to each other downstream of the carriage 57. Generally L-shaped actuator brackets 109 and 110 are fixed to and extend sidewardly from the downstream end of the carriage 57 between the switches S23 and S35 and carry adjustment screws, one of which is indicated at 111, engageable with the respective switches S23 and S35 as the carriage approaches its rearward and forward positions, respectively.

Figure 12:
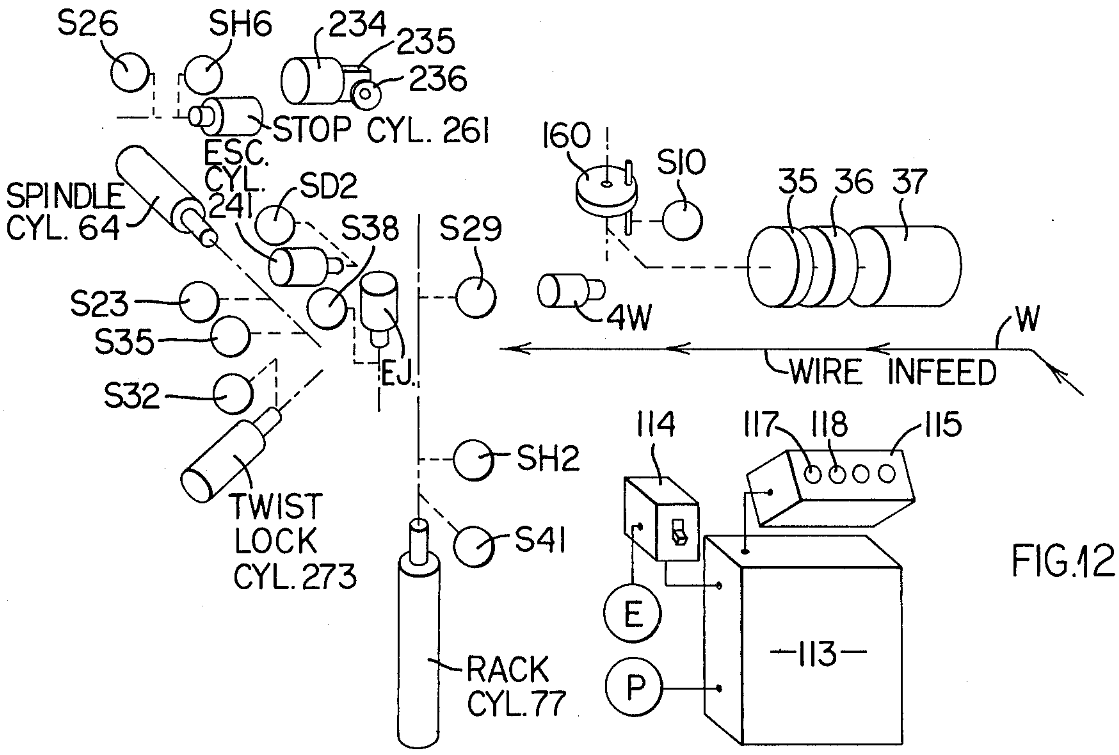
FIG. 12 is an oblique partially exploded schematic view taken substantially from the same orientation as FIG. 1 showing the wire feed and the ball feed drive motors as well as diagrammatically indicating the pattern of actuation of limit switches in response to movement of pressure fluid cylinders or other driven devices in the FIG. 1 machine.

It will be understood that the above-described elements, including motor 37, clutch 36, brake 35, cylinders 64 and 77 and switches SH2, S41, S23 and S35, may be interconnected in a conventional manner, preferably through suitable means in a central control box shown at 113 in FIG. 12. FIG. 12 further schematically shows connection of a suitable pressure fluid source P, such as a compressed air source, to control box 113 as well as connection of a suitable electrical supply E, such as a 110 volt a.c. sources through a master on-off switch 114 to control box 113. A control panel 115 (FIGS. 1 and 12) conveniently carries manually actuable control buttons, including a stop switch 117 for disabling the apparatus and a start switch 118 for initiating the operational cycle of the apparatus, such control panel 115 also being connected to control box 113 as schematically shown in FIG. 12.

Figure 16A:
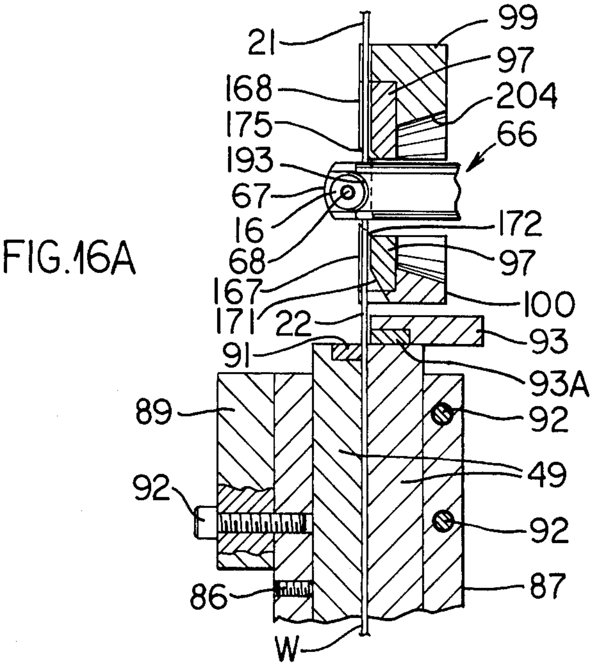
FIG. 16A, B and C are fragmentary top views taken substantially on the line XVI—XVI of FIG. 9 showing sequencing of the shear, main clamp and spindle.

To briefly summarize the operation of the components above described in securing a wire length WL to a ball 116 carried by spindle pin 68, during operation of the machine, the wire drive motor 37 is normally continuously rotating. Wire is fed by frictional engagement between the sets of upper and lower drive wheels 41 and 42 which are rotated by actuation of the clutch 36 with the brake 35 in a deactuated condition. When sufficient wire has been fed, so as to extend leftwardly beyond the spindle, as indicated at WL in FIG. 3, the brake 35 is actuated and the clutch 36 deactuated to stop drive wheels 41 and 42 and thus halt downstream movement of the wire W, leaving the wire positioned as shown in FIG. 16A. The double acting spindle cylinder 64 is then actuated to retract the carriage 57 and therewith spindle 66. As the latter begins to move rearwardly, the lower end of shear lever 93, by reason of rearward carriage movement, engages the wire W immediately upstream of the adjacent clamp member 97. The wheels 41 and 42 hold the wire against downstream advancement. At the same time, rearward spindle movement pulls the ball 16 rearward against the wire moving the wire against the front faces of clamp members 97 so as to start bending of the wire into a rearwardly pointing U-shape. In forming the U-shape, an increment of long leg 21 of the wire may be pulled past the ball 16, which freely rotates on pin 68 to permit such wire flow into the flowing U-shape. However, the short leg 22 of the wire is normally held fixed by engagement by the presently braked wire drive wheels, such that the wire length WL extending downstream from the shear plate 91 remains constant.

Figure 16B:
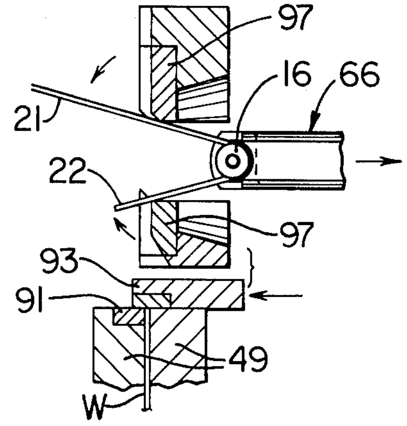
FIG. 16D is a similar view showing the lock twist jaws prior to lock twist formation.

Continued rearward movement of the spindle and carriage results in severing of the short wire leg 22 from the upstream portion of wire W by coaction of shear plate 91 and the forwardly advancing lower shear lever end 93, the latter also tending to urge forward the short wire end 22 as it is severed. FIG. 16B shows the rearwardly moving wire U-shape, comprising legs 21 and 22, being pulled rearwardly past the clamp members 97, following completion of shearing.

Figure 16C:
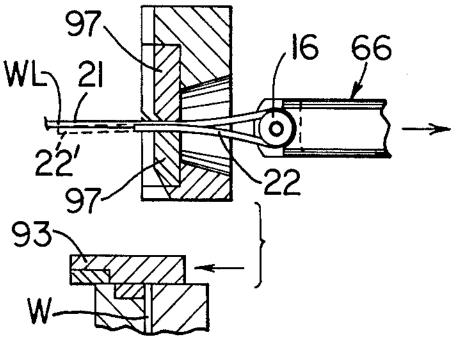

Continued rearward advancement of the carriage gradually closes the clamp members 97 on the wire, as indicated in FIG. 16C, such that the clamp members 97 will firmly clamp together the end extremity 23 of short wire leg 22 and wire leg 21 as the carriage reaches its rearwardmost position.

As carriage reaches its rearwardmost position, its rearward actuator 109, 111 contacts and triggers limit switch S23 which energizes rack cylinder 77 for upward advancement of rack 79. The latter starts twisting rotation of spindle 66 by rotating countershaft gears 82 and 72 and pinion 71. The resulting rotation of forward spindle end 67, pin 68 and ball 16, and thus the rearward, bight portion of the wire U-shape, forms the basic twist BT shown in FIG. 13.

The twist is completed when the rack 79 has risen sufficiently to bring actuator bar 107 into actuating contact with limit switch SH2, the latter then triggering spindle cylinder 64 to advance forwardly. In the first increment of forward advancement, the carriage 57, acting through dependent member 105, connecting rod 104 and disk 101, permits the clamp members 97 to spread apart sufficiently as to release the wire and permit its forward advancement with the spindle. As the carriage approaches its original, forwardmost position, its actuator 110 trips limit switch S35 which, as hereinafter more fully discussed, subsequently permits ejection of the FIG. 13 product from engagement with the spindle and downward retraction of the rack 79 by rack cylinder 77.

At the end of its twisting rotation, with the rack 79 in a raised position determined by abutment with the limit screw 84, the spindle pin 68 is left in a downwardly extending position (see FIG. 8) to facilitate removal of the product therefrom, by the assistance of gravity. It will be noted that as the carriage reaches its forwardmost position the above-described elements are returned to their original, or starting position above described in connection with FIG. 16A. Return of the rack 79 to its lowermost position reverse rotates the spindle 66, following removal of the FIG. 13 product therefrom, so that the spindle pin 68 once again points upward. As the rack 79 assumes its lowermost position, it preferably trips switch S41, by means of actuator bar 108, and the signal from switch S41 is preferably utilized, in the manner hereafter described, to initiate placement of another ball on the pin 68.

With the above summary of formation of the basic twist in mind, attention is directed to detailed aspects of the invention particularly of interest.

It is important that the wire feeding portion 26 be capable of feeding a closely controlled length of wire without slippage and further that the length of wire fed by conveniently adjustable to suit the output of the apparatus for different musical instruments. The majority of instruments require strings falling somewhere in the range of 36 to 42 inches but selection of a given length within this range is necessary to avoid production of ball-ended strings too short to be properly engaged by a tensioning key on the instrument or so long as to create an excessive length of tail extending from the key requiring a subsequent cut-off operation. Moreover, to produce ball-ended strings economically, it is necessary that the preselected length of wire be fed rapidly, e.g., in about one second.

To these ends, a support bracket 121 (FIG. 4) is fixed to a cross bar 122 low on the downstream end of frame 25 and angles in a direction rearwardly and downstream therefrom. A spindle bolt 123 (FIG. 5) fixed to and upstanding from the end of bracket 121 locates for free rotation thereon a disk 124 having a preferably V-shaped braking groove 126. The disk 124 is preferably supported by a thrust bearing or washer 127 and is adapted to support for rotation a rotatable wire supply, here shown as a reel 128 rotatably sleeved on the spindle 123 and held in snug frictional engagement with disk 124 by a nut 129 and washer 130 near the upper end of spindle 123. Pulling of wire W from the reel 128 rotates both the reel and disk 124.

Figure 4:
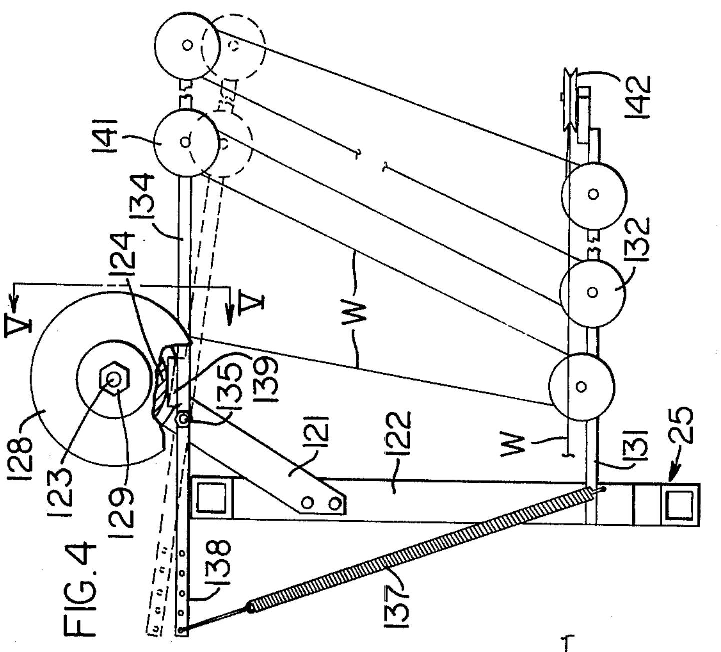
FIG. 4 is a fragmentary, partially broken, enlarged top view of the de-reeler portion of the machine, which is located low on the upstream end of the frame.
Figure 5:
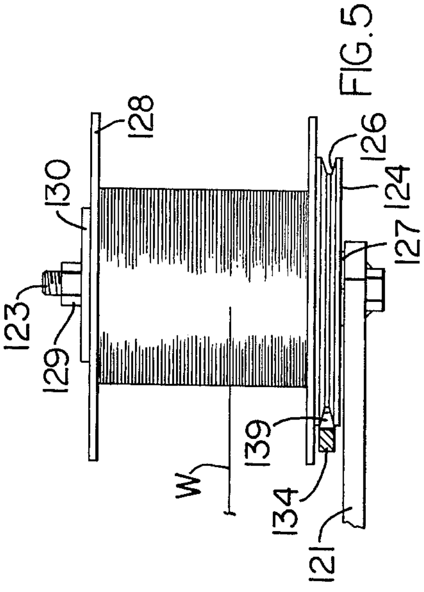
FIG. 5 is an enlarged fragmentary sectional view substantially as taken on the line V—V of FIG. 4.

An arm 131 is fixed to and extends upstream (rightwardly in FIG. 4) from the forward portion of frame cross member 122 and carries a series (e.g. six) of spaced horizontal and freely rotatable pulleys 132. A further arm 134 is horizontally pivoted near its leftward end immediately inboard of disk 124 on bracket 121 as by a pivot bolt 135. Tension spring 137, fixed at its forward end to frame cross bar 122, angles rearwardly and is selectively engageable with any one of several holes, or the like, 138, distributed along the left end of pivoted arm 134 to bias the latter counterclockwise with a selectabe spring force. A brake pad 139 fixed on arm 134, and which may conveniently comprise a segment of conventional V-belting, is normally urged by spring 137 into friction braking engagement in the groove 126 of disk 124 for quickly halting the rotation of even a relatively heavy wire reel 128 to eliminate overshoot, and to normally hold the reel 128 against rotation. An additional series of pulleys 141 (e.g., five in number) are spaced along and freely rotatably supported on the rightward end portion of pivoted arm 134. As seen in FIG. 4, the wire W is led from the reel 128 in a serpentine manner between successive pulleys of the forward and rearward pulley sets 132 and 141. The wire is led from the rightwardmost pulley 132 over a vertical pulley 142 at the free end of fixed arm 131 and thence is angled upwardly and leftwardly (downstream) over a vertical guide pulley 143 substantially into horizontal alignment with the wire path through guides 47–49 above discussed. The guide pulley 143 is rotatably supported on a suitable bracket system 144 fixed to and generally upstanding from the upstream end of frame 25.

The bracket 144 here also supports, immediately upstream of guide pulley 143, a wire wiper 146 (FIGS. 1 and 3) resembling a common spring loaded clothespin and having feltlined jaws engageable with the wire W for removing any foreign material from the wire passing therebetween and for applying a minimal tension thereto during feeding.

Figure 7:
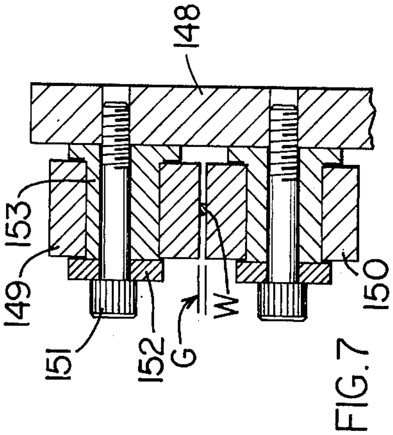
FIG. 7 is an enlarged fragmentary sectional view substantially taken on the line VII—VII of FIG. 3.

In those instances where circular cross section wire is being fed from the reel 128, but wherein the ball-ended wire produced by the apparatus is to be subsequently wrapped or wound with a further wire to produce a wound musical instrument string, it may be desired to provide flats on the circular cross section wire to prevent slippage of the second or winding wire on the ball-ended wire during the subsequent winding operation. Particularly, the edges of such flats tend to slightly bite into the winding wire and tend to eliminate any tendency for the wound wire to slip or unravel subsequent to winding. To this end, the bracket system 144 includes an upstanding bar 148 fixed atop the frame 25 intermediate guide pulley 143 and initial guide 47. As seen in FIG. 7, annular flattening rollers 149 and 150 are rotatably mounted by screws 151, washers 152 and sleeves 153 on the bar 148 immediately above and below the wire W. One sleeve 153, here the upper, is eccentrically bored and hence eccentrically located on its screw 151. By loosening the screw 151, the eccentric sleeve 153 can be angularly adjusted thereon to vary the wire receiving gap G between rollers 149 and 150. Tightening of such screw retains the angular position of eccentric upper sleeve 153 and hence retains such gap. Thus, the sleeve 153 can be adjusted to provide a desired degree of flattening of the wire W by rollers 149 and 150 or to space such rollers greater than the diameter of the wire so that no wire flattening or retardation occurs. Thus, wire flattening, where desired, can be made an inherent part of the ball-ending operation.

Figure 6:
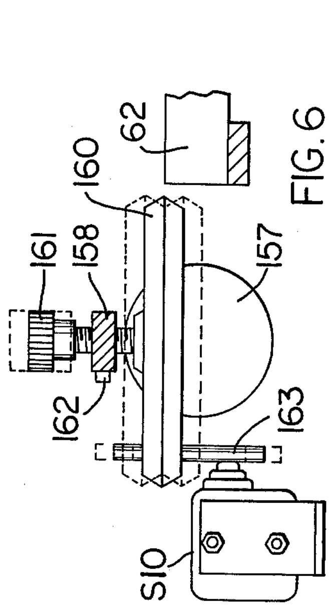
FIG. 6 is an enlarged fragmentary sectional view substantially taken on the line VI—VI of FIG. 3.

A rearward extension 156 of the output shaft of gear unit 34 fixedly mounts and rotatably drives a disk 157. A generally Z-shaped bracket 158 is fixedly, but forwardly rearwardly adjustably, mounted atop the frame 25 behind driven disk 157. A horizontal timing wheel 160 (FIGS. 2, 3 and 6) is vertically fixed on but freely rotatable on the lower end of a height adjustment screw 161 threadedly engaging the overhanging, forward portion of the Z-bracket 158. A locking screw 162 normally fixes the screw 161 with the respective bracket 158 but is releasable to permit threaded adjustment of screw 161. The bracket 158 is normally adjusted such that the beveled periphery of timing disk 160 engages the opposed face of disk 157 in friction driving contact such that rotation of disk 157, which is proportional to the length of wire W fed by drive wheels 41 and 42 due to the interconnection of the gears 43–45, will proportionally rotate timing wheel 160. A pin 163 fixed to and dependent from a peripheral portion of timing wheel 160 trips a limit switch S10 (fixed by appropriate bracketing to frame 25) once in each rotation of timing wheel 160.

The switch S10 connects in any conventional manner (not shown) through central control box 113 to deactuate magnetic clutch 36 and actuate magnetic brake 35 upon completion of one revolution by timing disk 160. More particularly, a first operational cycle of the apparatus may be initiated by manual actuation of start button 118 (FIG. 12) which conventionally and through control box 113 energizes magnetic clutch 36 and secures brake 35 in a de-energized condition, causing the gear box 34 to rotate drive wheels 41 and 42 for feeding wire downstream therebetween past spindle 67 and concurrently rotating timing wheel 160 in a proportional manner. The amount of wire fed in one revolution of timing wheel 160 is preselectable by varying the radius at which disk 157 frictionally engages and drives the beveled periphery of timing wheel 160 and, after one revolution, timing wheel 160 trips switch S10 with pin 163 to turn off clutch 36 and turn on brake 35, stop drive wheels 41 and 42 and halt further advancement of the wire, such that the preselected length of wire has been fed beyond shear 90, 93. Length is controlled within about ± 1/16 inch.

At the beginning of wire feeding and upon initial rotation of drive wheels 41 and 42, slippage between the wheels and wire is avoided despite the high inertia, braked condition of supply reel 128. More particularly, wire W is initially drawn from the serpentine between pulley sets 132 and 141, which act is concert as a multiple purchase pulley stream, and in cooperation with the relatively long lever arm effected by the substantial spacing of the pulleys 141 from the pivot 135, to permit the pulleys 141 and rightward portion of arm 134 to move into and narrow the serpentine. Thus, the restoring force of spring 137 is overcome by only a relatively light tensioning of the wire, well within the capability of the friction drive wheels 41 and 42. As the arm 134 pivots toward its dotted line position, it substantially reduces the braking force between brake pad 139 and disk 124 permitting additional wire to be drawn into the serpentine from the now rotating reel 128. When the preselected length of wire has been fed and wheels 41, 42 stop the reel 128 over-travels only sufficient to permit the serpentine to widen and the arm 134 to pivot back to its solid-line position of FIG. 4 whereupon the brake 139 to fully set once again.

As the leading end 21 of wire W is fed downstream past the downstream end of guide members 49 and the lower shear lever end 93, it must pass in properly guided fashion across the front faces of the spread-apart clamp members 97 on main clamp arms 100 and 99 and behind the grooved portion of ball 16 located on the upstanding pin 68 at the front end of the advanced spindle 66, which is located closely between the spread-apart clamp members 97. The clamp members 97 and front end of spindle 66 are particularly configured to avoid loss of the leading end of the wire from its intended path. More particularly, the clamp members 97 are provided with respective grooves (here of truncated V-cross-section) 167 and 168 in the front faces thereof and which in the spread condition of the clamp members 97 shown are aligned with the path of wire W. The clamp members 97 are recessed in the upper ends of clamp arms 99 and 100 at the inner edges thereof and the upper arm ends preferably having widening grooves extending from grooves 167 and 168 in the clamp members 97. The upstream end 171 of upstream clamp member groove 167 preferably diverges both vertically and rearwardly in the upstream direction to facilitate entry of the leading end of the wire into such groove 167. The upstream clamp member 97 preferably has its front face extended somewhat downstream (leftwardly in FIG. 9) to form a lip 172 with a beveled rear face, the rearward extent of the lip 172 corresponding to that of the groove 167. The opposed edges of groove 167 diverge at 173, forming a truncated, forwardly rearwardly extending slot in the lip 172. In this manner, the lipped portion of upstream clamp member 97 can somewhat overlap the spindle 66 to more reliably guide the leading end of the wire to the spindle. A bevel 175 on the forward, upstream edge of downstream clamp member 97 is complimentary to the beveled rear face of lip 172 on the upstream clamp member 97 and snugly underlies same when the clamp members 97 are brought together to grip the wire legs as the spindle 66 approaches its rearward position as generally indicated in FIG. 16C. The clamp members 97 are removably secured in recessed relation in the front faces of the upper ends of arms 100 and 99 by means such as the screw-held bar 176, screw 177 and screw 178. Screw 178, with secures the lower edge of downstream clamp member 97, preferably is a flat-headed Allen screw with its head set flush with the front faces of arm 99 and downstream clamp member 97 to enable advancement of lock twist jaws hereafter described into close overlapping relation with the front face of downstream clamp member 97 in the lock twist mode of the apparatus.

The arms 99 and 100 (FIG. 10) carrying the clamp members 97 have overlapped flanges 180 and 181 extending inward at points intermediate their ends and preferably at the level of the carriage support shafts 58 and 59. A plate 182 carried by the forward ends of carriage support shafts 58 and 59 ahead of arms 99 and 100 carries a rearwardly extending central pivot member 183 which penetrates and pivotally supports flanges 180 and 181. The pivot member 183, which is located somewhat above center with respect to arms 99 and 100, pivotally supports such arms with respect to the frame 25.

The lower ends of arms 99 and 100 carry camming rollers 184 and 185 by means of through-bolts one of which is indicated at 186. A tension spring 187 is secured between the forward ends of through-bolts 186 to urge the rollers 184 and 185 snugly against the camming plate 101 and thereby tend to hold the clamp members 97 in spaced apart, or open, relation. In the preferred embodiment shown, the camming disk 101 carries oppositely directed frusto-conical cams 188 and 199 on opposite sides, which upon counterclockwise rotation (FIG. 15) of the camming disk 101 during rearward movement of carriage 57, engage and push apart the rollers 184 and 185 on the lower ends of arms 99 and 100 to bring the clamp members 97 together against the wire legs generally as shown in FIG. 16C. The cams 188 and 199 are removably secured to the disk 101 by screws and can be quickly exchanged for another pair of frusto-conical cams having a different ramp angle. By thus changing cams 188 and 199 and exchanging clamp members 97 for similar clamp members with grooves 167 and 168 of differing dimensions, the clamp system is quickly adaptable to handle wires of substantially differing diameter.

To reliably lead the end of wire W behind a ball 16 on the forward spindle end, and referring in particular to (FIGS. 8A and 9), the front facing wall of chordal step 69 has a diametral wire groove 191 opposed to the groove in ball 16 to receive the advancing wire end therebetween. The bevel 192 at the upstream end of groove 191 facilitates wire end entry. In the front spindle position, groove 191 aligns with grooves 167 and 168 in spread clamp members 97. To facilitate reliable dropping of a ball 16 onto spindle post 68, a semicircular forward facing ball groove 193 opens upward from the deeper wire groove 191.

Figure 8:
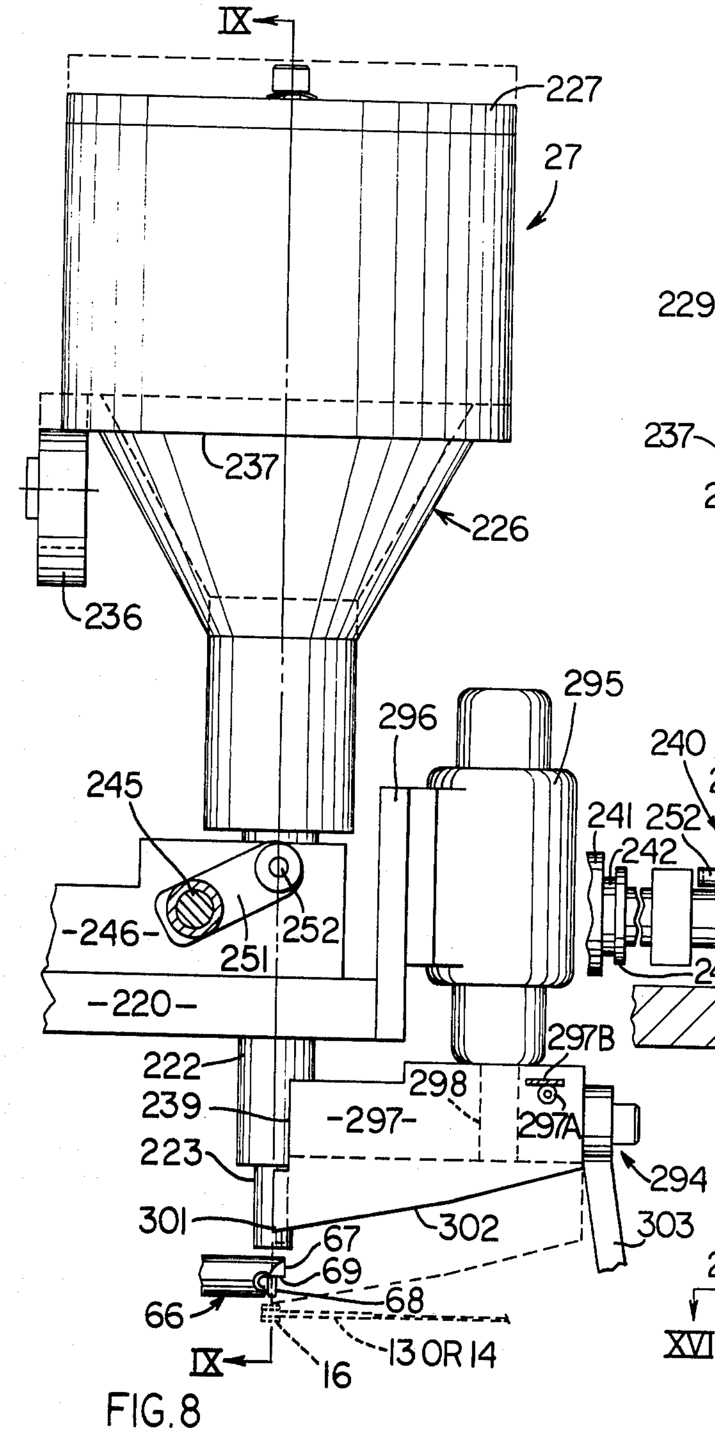
FIG. 8 is an enlarged partly broken view of the ball feed and ejector units taken from the downstream end of the machine.
Figure 8A:
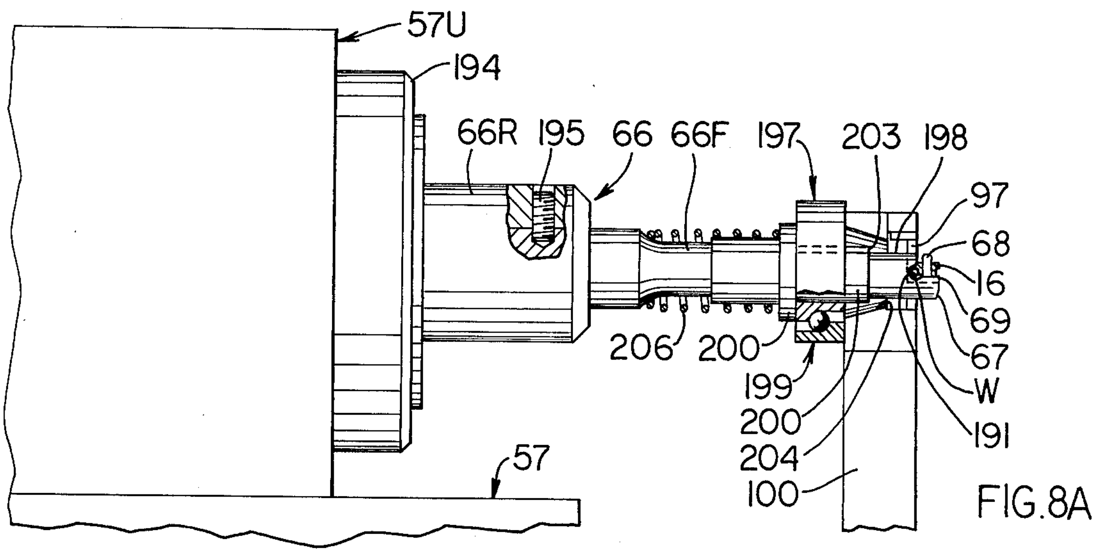
FIG. 8A is a view similar to FIG. 8 but of the ball keeper and spindle portion below the ball feed unit.
Figure 15:
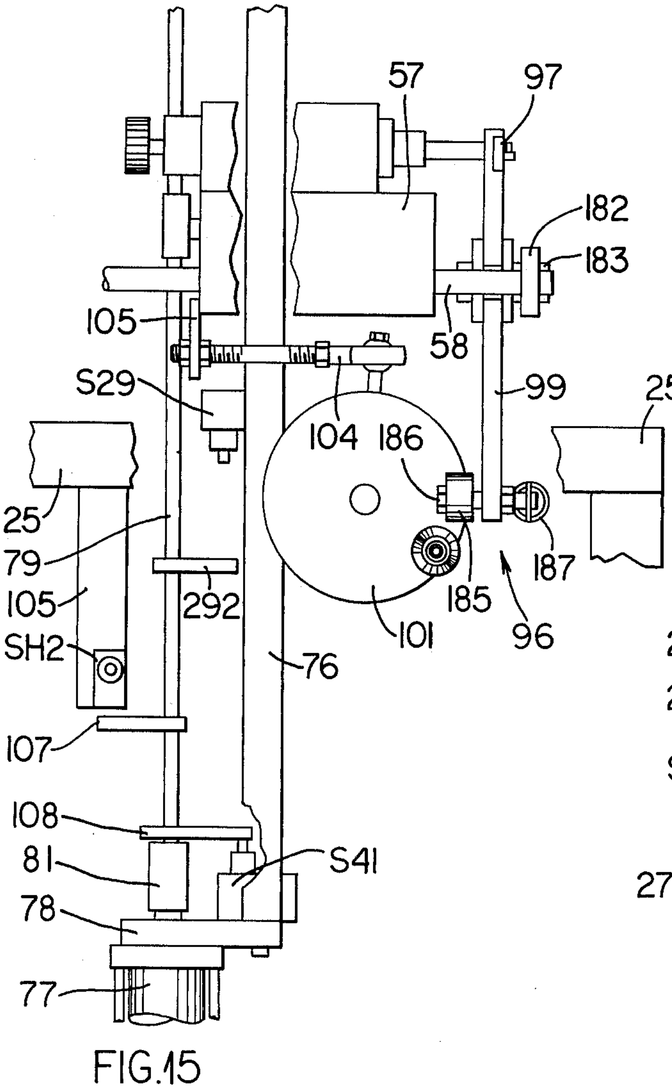
FIG. 15 is an enlarged partly broken view of the lower portion of the rack and main clamp drive seen from the downstream end of the FIG. 1 machine.

As seen in FIG. 8A, the spindle 66 preferably comprises sepearable front and rear portions 66F and 66R. The front portion 66F can be replaced, as to accommodate substantial changes in wire diameter. The rear spindle portion 66R, supporting pinion 71, is supported by bearings 194 on the upper portion 57U of carriage 57. The rear end of front spindle portion 66F is coaxially recessed in rear spindle portion 66R and held by a set screw 195.

A ball keeper unit 197 prevents a ball 16 from dropping off spindle pin 68 when the latter is downwardly directed and the spindle is at least partly retracted rearwardly. The ball keeper unit 197 can be used or not, as desired, in the single twist mode of the apparatus, but is primarily intended for use in the double twist (basic and lock twist) mode where the spindle does not immediately completely advance after formation of the first twist and before formation of the lock twist.

A flat 198 extends rearward from the top of pin 68 part way along the front spindle portion 66F. The ball keeper unit 197 comprises an axial thrust bearing 199 having an outer, front facing portion bearing against the rear of clamp arms 99 and 100. A sleeve 200 has a rearwardly facing step and a reduced diameter front portion, chordally cut away in the same plane as flat 198, which extends forward through a snug bore in the inner race of bearing 199. The flat of a tab 203 bears upon the flatted portions of the spindle and front portion of sleeve 200 for rotation therewith. Tab 203, preferably of chordal cross section, is elongate and extends forward with sleeve means 201 and is press fitted within the inner bearing race of bearing 199. The exterior surface of tab 203 is preferably rounded to smoothly continue the circumference of the forward spindle portion 66F. The opposed rear edges of clamp arms 99 and 100 are recessed at 204 to loosely receive portions of sleeves 200 and 201 in front of bearing 199. A coil spring 206, axially compressed between the rearward facing step of sleeve 200 and the enlarged diameter rear end of front spindle portion 66F, holds the bearing 199 against the rear faces of clamp arms 99 and 100, as the spindle is withdrawn rearwardly and the clamp members 97 are brought together. The post 68 thus moves rearward under tab 203 and the latter positively prevents removal of the ball 16 off the post 68, even with the post 68 downwardly pointing, except, of course, in the forwardmost spindle position shown in FIG. 8A.

Figure 3:
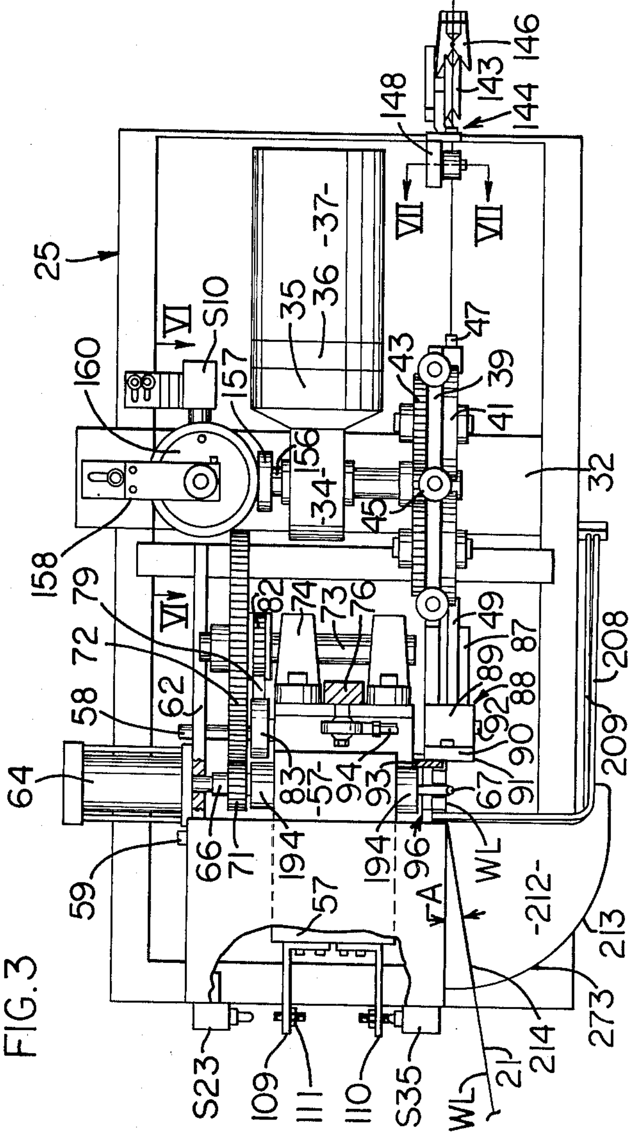
FIG. 3 is a fragmentary top view of the machine of FIG. 1 with the ball feed unit, product ejector unit, and shear drive unit, as well as certain limit switches broken or removed for clarity.

As the leading end of the wire is advanced downstream past the forwardly positioned spindle 66 and spread clamp members 97, it passes between the vertically offset and forwardly extending legs of a pair of L-shaped rods 208 and 209. Such rods are supported at the rearward ends of the rearward legs fixedly with respect to the frame 25 as by securement to the front face of support 61 (FIG. 2). As seen in FIGS. 1 and 3, the remaining legs of rods 208 and 209 dangle downwardly and upstream in front of the spindle 66 with the leg of lower rod 209 offset behind the leg of rod 208, the free ends of the rods being joined by a block 210.

As the advancing wire end advances downstream beyond the rear legs of rods 208 209, it passes along and atop a guide plate 212 (FIGS. 1 and 2). The guide plate 212 preferably has a rounded downstream and forward edge 213 and an upstanding and somewhat forwardly angled flange 214 joined thereto by a bend 216 along which the advancing wire is guided. The flange 214 and bend 216 are preferably angled somewhat forwardly, in a horizontal plane, to deflect the wire L somewhat forwardly as it proceeds along the bend 216. This horizontal angle A (FIG. 3) preferably lies in the range of 10°–20°. When the spindle is shifted rearwardly to form the U-shaped bend in the wire shown in FIG. 16B, the long leg 21 (FIG. 3) of the wire will sweep forwardly between the rear legs of rods 208 and 209 and along the top of guide plate 212, substantially following the arc of its edge 213, such that when the spindle reaches its fully rearward position, the wire will extend substantially forwardly from the spindle and clamp area and through the bend zone of rods 208 and 209. After the product has been completed and ejected from the spindle, the weight of the long leg 21 of the wire extending forwardly beyond the rods 208 and 209 will, due to gravity, tend to draw the beaded end of the wire forwardly into contact with the rods 208 and 209. Thereafter, the product slides downwardly by gravity along the rods 208 and 209 to contact the block 210 where a production run of completed bead-ended strings collect for subsequent removal. Thus, the rods 208 and 209 are everywhere spaced at a distance somewhat exceeding the diameter of wires to be handled thereby but this spacing, at least in the downwardly angled legs, is less than the diameter of the ball to enable the rods 208 and 209 to support the product by means of its ball.

As seen in FIG. 1, a horizontal table 220 is fixedly supported upon the downstream end of frame 25 above the downstream portion of the carriage 57. The forward end of table 220 fixedly carries the flange 214 and guide plate 212 and also supports the ball feed portion 27 of the apparatus.

The preferred ball feed unit 27 includes an upstanding tube 222 fixed to and extending through a hole in the table 220 in coaxial alignment above the forward position of spindle post 68. The lower end of tube 222 is necked down at 223 and the upper end is tapered at 224. A hopper 226 may be filled with a quantity of balls 16 by pivoting of a cover 227 upon a screw 228 to open the upper end of the hopper. The hopper 226 has a cylindrical upper portion 229, a downwardly tapered mid portion 230 and a sleevelike lower portion 231 which snugly but slidably and rotatably telescopes over the upper end of tube 22 in spaced relation above table 220. A platform 232 (FIG. 1) spaced above and supported by table 220 fixedly mounts a hopper drive motor 234 which through a gear box 235 supports and continuously rotatably drives an eccentric 236 (FIG. 8). The upper and mid portions 229 and 230 of hopper 226 content through a downwardly facing annular step 237 which rides atop the eccentric 236 to vertically locate the hopper 226 on the tube 222. Rotation of the eccentric 236 oscillates the hopper 226 up and down with respect to the tube 222, and also rotates the hopper with respect to the tube. Downward movement of the hopper to its solid-line position of FIG. 8 causes the upper tube end, assisted by taper 224, to penetrate into the mass of balls 16 in the hopper, while upward movement of the hopper to its dotted line position of FIG. 8 causes the balls to fall into the cavity vacated by the upper tube end. The latter, together with continuous rotation of the hopper causes the balls to enter the upper tube end and form a column 16C (FIG. 9) of coaxial balls 16 in the upper ends portion of tube 222.

An escapement 240 (FIGS. 1 and 9) coacting with tube 222 below the hopper 226 is actuable for dropping the lowermost ball 16 in the tube 222 downwardly onto the upwardly facing spindle pin 68. The escapement 240 includes an escapement pressure fluid cylinder 241 fixedly supported on table 220 downstream of the hopper 226 and having a spring retracted, pressure fluid advanced, piston rod 242 fixedly supporting a rearwardly extending switch actuator tab 243 for actuating a limit switch SD2 fixed on table 220, upon retraction of such piston rod. An extension 245 of the piston rod 242 passes to the rear of tube 222 and is preferably guided by a block 246 fixedly supported on table 222 and through which the tube 222 vertically extends. The upstream end 247 of extension 245 fixedly carries a forwardly extending arm 248. A lower ball support pin 249 extends slidably through openings in tube 222 and block 246 diametrally into the bore of tube 222 in blocking relation beneath the column 16C of balls 16, with the pressure fluid cylinder in its normal retracted position shown. A further arm 251 is fixed to and angles upwardly and forwardly from rod extension 245 and horizontally slidably supports an upper pin 252 which extends diametrally through openings in the block 246 and tube 222 about one and one-half ball lengths above lower pin 249. A spring 253 is compressed between the arm 251 and a collar 254 adjustably fixed to the pin 252 near the block 246 and urges the pin 252 into the tube 222. A further collar 255 fixed on the downstream end of the pin behind arm 251 limits rightward movement of pin 252 such that in the retracted cylinder position shown, the pin 252 lies just outside the bore of tube 222, out of ball contacting relation. Upon advancement (rightwardly in FIG. 9) of pressure fluid cylinder piston rod 242 and extension 245, lower pin 249 moves out of the bore of tube 222 while pin 252 is permitted by corresponding advancement of arm 251 to move into engagement with the second lowermost ball 16 in column 16C, the spring 253 permitting a degree of lost motion between extension 245 and upper pin 252 and causing the pin 252 to hold the second lowermost ball, in the column 16C atop same, in position while removal of the lower pin 249 permits the lowermost ball 16 to fall downwardly through the tube 222 and onto the top of spindle pin 68.

Figure 17:
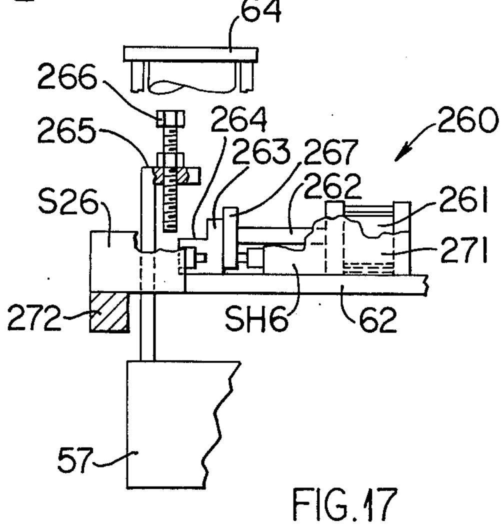
FIG. 17 is an enlarged partly broken top view of the stop unit behind the carriage and seen at the rear downstream corner of FIG. 2.

Turning to portions of the apparatus concerned with forming of the lock twist LT (FIG. 14), a stop unit 260 (FIGS. 2 and 17) includes a pressure fluid actuated, spring retracted cylinder 261 fixed to the rear face of support 62 at a level above spindle cylinder 64. The piston rod 262 of stop cylinder 261 extends downstream therefrom and carries a generally L-shaped stop block 263 having a rear step surface 264 preferably chamfered at its downstream end. A generally L-shaped bracket 265 is fixed to and extends rearwardly from carriage 57 above support 62. For clarity, the carriage 57 is shown intermediate the ends of its travel. An adjustable stop screw 266 carried by the rear leg of bracket 265 extends forward toward carriage 57. With the carriage 57 fully to the rear, cylinder 261 is actuable to extend its piston rod 262 downstream and place the step 264 of stop block 263 in front of stop screw 266, normally with a clearance therebetween of about 15–20 thousandths of an inch. With the stop block 263 thus positioned, forward movement of the carriage 57 from its fully retracted position is limited, by abutment of stop screw 266 with step 264, to such 15–20 thousandths inch distance. Retraction of the stop block 263 to its upstream position shown draws same out of the path of screw 266 and permits full advancement of the carriage 57. A switch actuator plate 267 is fixed to piston rod 262 and extends upward to actuate downstream and upstream limit switches S26 and SH6 when reaching its extended and retracted positions, respectively. The upstream switch SH6 is fixed atop a plate 271 in turn fixed atop stop cylinder 261. Downstream switch S26 is spaced above bracket 265 and is conveniently fixed with respect to the frame 25 as by securement to the upstanding rear, downstream leg 272 (FIG. 2) of table 220, or may be pendently secured to the rear edge of table 220.

Figure 10:
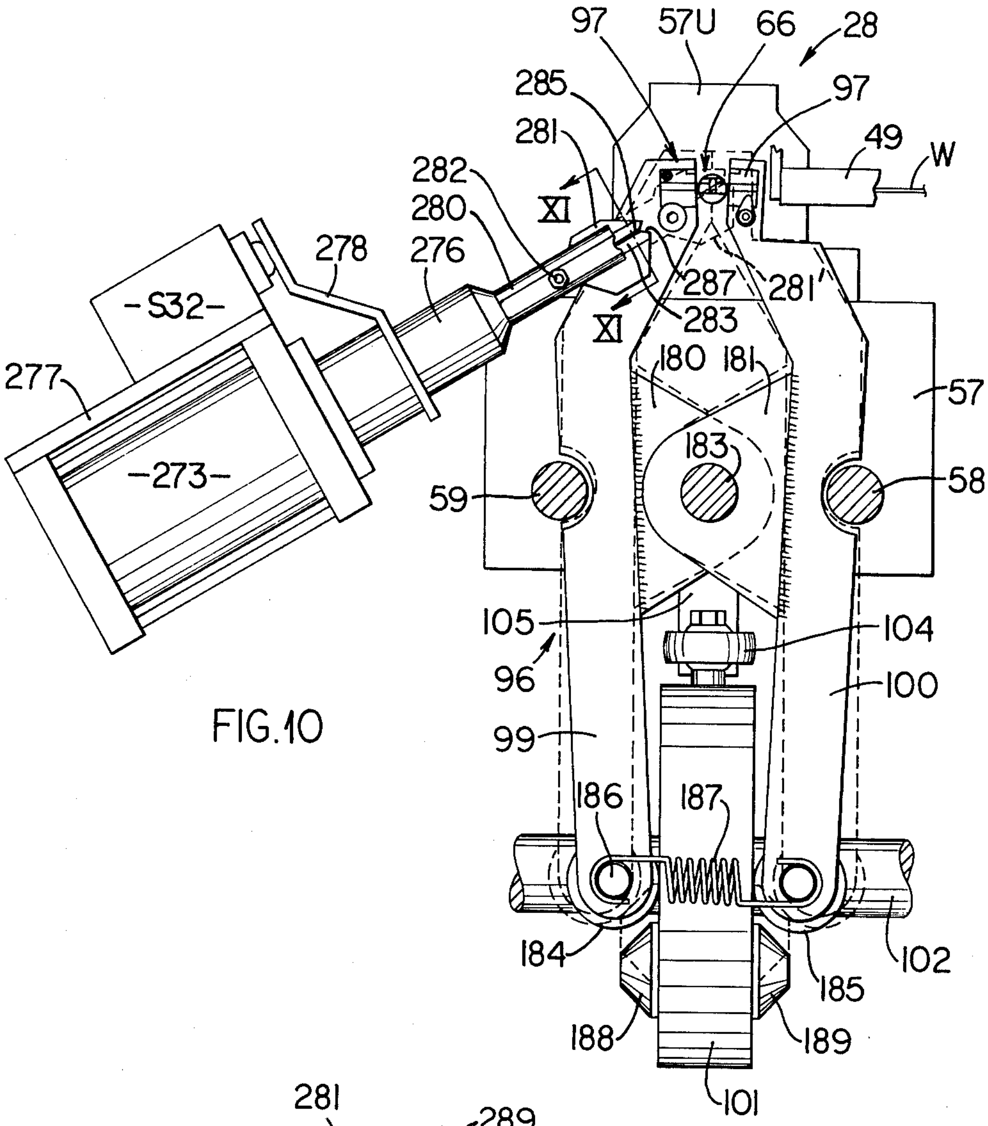
FIG. 10 is an enlarged fragmentary front view of the downstream end portion of the FIG. 1 machine with the front carriage support removed and showing the main and locking clamp mechanism in relation to the carriage.

A pressure fluid advance, spring retracted lock twist cylinder 273 (FIGS. 1 and 10) is fixed with respect to frame 25, as by securement to the front face of front support 61 as through suitable bracketing 274. The lock twist cylinder 273 is mounted at an angle and has a piston rod which slopes upwardly and upstream toward the spindle 66 and fixedly mounts an adaptor 273 thereon for extension and retraction therewith. A limit switch S32 is fixed atop lock twist cylinder 273 by a plate 277. Switch S32 is actuable by an actuator member 278 secured to piston rod adaptor 276 when the latter retracts to its retracted position shown in FIG. 10. An axially grooved member 280 is fixed to and extends coaxially forward from adaptor 276 and a lock twist jaw member 281 (FIGS. 10 and 11) is removably affixed to the rear face of grooved member 280 as by nut and bolt means 282 and extends axially therebeyond in close spaced relation in front of clamp arm 99. The free end of jaw member 281 is sloted to receive a jaw defining, wiring engaging insert 283 fixedly therein, and preferably tapers away from the insert 283 as seen in FIG. 10. The insert 283 is fixedly secured in the jaw member 281 by any convenient means not shown.

A wire receiving slot 285 opens through the front face 286 of the insert 283 and extends longitudinally inboard along the insert from the free, or spindle-adjacent, end thereof. The free end of the insert is beveled as generally indicated at 287 so that the slot 285 opens divergently toward the spindle 66. A twist recess 288 opens through the rear face 289 of the insert 283. The recess 288 communicates with the slot 285 and extends longitudinally of the insert therewith. The width of slot 285 slightly exceeds the diameter of the wire element WL to be lock twisted and the width of recess 288 slightly exceeds three times the wire diameter. For a wire approaching 0.012 inch diameter the widths of slot 285 and recess 288 may be 0.012 inch and 0.036 inch, respectively.

Figure 11:
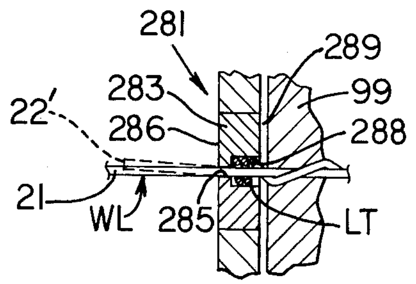
FIG. 11 is an enlarged fragmentary sectional view substantially taken on the line XI—XI of FIG. 10.
Figure 16D:
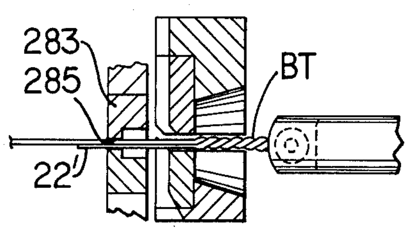

As hereafter discussed, lock twist cylinder 273 is actuated to advance the jaw member 281 into engagement with the wire legs 21 and 22' after achievement of the rearward carriage position has closed main clamp members 97 on the wire and preferably prior to the spindle rotation needed to form the basic twist BT. In this state the wire ends protrude forwardly beyond the clamp members 97, a longer than usual short wire leg 22' having been formed by the shearing operation. The bevels 287 at the open end of slot 285 facilitate entry of the wire legs into the slots 285 and recess 288 as the advancing nose of lock twist jaw member 281 moves past the axis of spindle 66 to its dotted line position 281' of FIG. 10. In this manner the wire legs 21 and 22' become located in and extend forwardly beyond the slot 285, as generally shown in FIGS. 11 and 16D.

Additional components particularly associated with formation of the lock twist LT includes a top limit switch S29 (FIGS. 2 and 15) fixed to the post 76 below collar shaft 73. Switch S29 is actuable by a bar 292 fixed to the rack 79 after sufficient upward rack movement as to complete both the basic and lock twists BT and LT.

Also in the lock twist mode, a pressure fluid valve 4W (FIG. 12) is interposed in one of the pressure fluid connections to the rack cylinder 77, namely the connection through which the rack cylinder exhausts during its extension to lift the rack 79. Also in the lock twist mode, the rack limit screw 84 (FIG. 1) is either eliminated or adjusted to an elevated position so as to permit sufficient upward movement of the rack 79. A further characteristic of the lock twist mode is that the output of actuator switch 23 is redirected so as to, upon actuation, advance the lock twist and stop cylinders 273 and 261 and thereby indirectly, rather than directly as in the single twist mode, actuate the rack cylinder 77 to raise the rack 79. Operation in the lock twist mode is discussed hereafter.

In either the single twist or double (lock) twist mode, an ejector unit 294 (FIGS. 1 and 8) assures removal of the completed FIG. 13 of FIG. 14 product 13 or 14 from the forwardly advanced, downwardly extending spindle pin 68. The ejector unit 294 includes a pressure fluid extended, spring retracted pressure fluid cylinder 295 fixed by an upstanding bracket 296 to the front end of table 220 forward of hopper 222. An ejector block 297 is fixed to the downwardly extending piston rod 298 of cylinder 295 and has a grooved, stepped rear edge 299 complementary to and guided for vertical movement on the lower end portion of tube 222 at and immediately above its neck 223. The front face 67 of spindle 66 is coextensive with hopper tube neck 223. Actuation of cylinder 295 shifts block 297 from its solid line position of FIG. 8 downward along neck 223 and front spindle end 67 such that the lower rear edge 301 of block 297 engages the twist portion of the product 13 or 14 immediately ahead of ball 16 to positively force same downward out of contact with and off pin 68. The lower face 302 of block 297 preferably slopes forwardly and up to avoid contact with the product other than substantially at edge 301. A guide bar 303 is fixed to and depends from the front face of block 297 and, by blocking immediate upstream movement of the beaded end of the wire, tends to assist gravitational forces on the forwardly directed unballed end of the wire end pulling the wire forwardly so that the ball rests on rods 208 and 209.

Operation of the apparatus in its two twist (basic plus lock) mode for producing product 14 (FIG. 14) may be summarized as follows. With electrical potential supplied to the apparatus from source E through main switch 114 (FIG. 12) so as to turn on motors 37 and 234 and supply potential to start switch 118, and with pressure fluid (preferably compressed air) supplied from source P, depression of the start switch 118 initiates the operational cycle. A holding relay (not shown) may be conventionally actuated by start switch depression to permit release of the start switch without disrupting current supply to conventional circuit paths controlled by the several limit switches above described. Further, start switch depression, for example by turning on a conventional brake-clutch relay, deactuates brake 35 and actuates clutch 36 rotating wire drive wheels 41 and 42 to feed wire from the reel 128. When timing wheel 160 completes one rotation it actuates switch S10 which stops and holds the wire W by deactuating clutch 36 and actuating brake 35 (as by deactuating the mentioned brake-clutch relay). The switch S10 simultaneously energizes the spindle cylinder 64 to retract the carriage 57.

In the two twist mode, the length of shear connecting rod 94 is adjusted somewhat longer than in the single twist mode, locating the shear blade 93A initially somewhat behind its FIG. 16A position. Thus, the wire is sheared with the spindle 66 further rearward than in the single twist mode, providing the extra length of short wire leg 22' later to be used for forming the lock twist LT. Movement of the carriage 57 substantially to its rearward position acts through connecting rod 104 (FIGS. 10 and 15), camming disk 101 and clamp arms 99 and 100 to bring the clamp members 97 (substantially as in FIG. 16C) to clamp the wire legs firmly therebetween, leaving the tail portion of the extra length short leg 22' extending with the long leg 21 forwardly therefrom. As the carriage 57 assumes its rearward position its actuator 109 trips switch S23 (FIG. 3) which then (for example through a conventional relay) actuates the lock twist cylinder 273 and stop cylinder 261 (FIGS. 10 and 17) to advance. Lock cylinder advancement engages the wire legs 21 and 22' snugly in the slot 285 of the now advanced lock twist jaw member insert 283. Advancement of the stop cylinder 261 advances stop block 263 into position ahead of the stop screw 266 with a small gap (e.g. 0.020 inch) therebetween, and also causes actuator 267 to release switch SH6 and actuate switch S26.

Actuated switch S26 energizes the rack cylinder 77 to advance, lifting the rack 79 and hence rotating the spindle 66 sufficient to form the basic twist BT by the time actuator 107 (FIG. 15) on rack 79 has risen to actuate switch SH2. In the preferred embodiment, switches SH6 and SH2 are series connected such that switch SH2, though actuated, can only perform its functions when switch SH6 is in its mentioned released condition. Thus, at this point switch SH2 is actuated and by any convenient means such as a metering valve (schematically shown at 4W in FIG. 12 and arranged in the exhausting air line of the advancing rack cylinder 77) momentarily stops upward advancement of the rack, and hence twisting rotation of the spindle, to allow time for the spindle cylinder to advance from its present retracted position. The mentioned actuation of switch SH2 also actuates the spindle cylinder 64 to carry out such advancement. Such advancement of the carriage 57 by the spindle cylinder is of course limited by the mentioned interposition of the stop block 263 in the path of stop screw 266, but is sufficient to partially separate main clamp members 97 sufficient to allow rotation of the wire therebetween.

At this point the momentary blockage of the rack cylinder exhaust by metering valve 4W automatically ceases and the rack cylinder 77 resumes its upward advancement of the rack 79, again rotating the spindle 66 and therewith the wire to form the lock twist LT. Particularly, the lock twist forms as the spindle rotates the long wire leg 21 in the slot 285 and recess 288 in insert 283 of the lock twist jaw member, drawing the short wire leg 22' into the recess 288 wherein the opposed walls of the recess snugly wrap short leg 22' around long leg 21 as the latter rotates. The keeper unit 197 (FIG. 8A) maintains its tab 203 opposed to spindle post 68 to prevent loss of the ball 16 therefrom during advancement of carriage 57 against the stop block 263, and indeed at any time the carriage is not in the forwardmost portion of its path.

As the lock twist LT is completed, the rack 79 is brought to its topmost position by rack cylinder 77, its actuator 292 (FIG. 15) actuates switch S29 and the upward moving rack is mechanically stopped with spindle pin 68 pointing down. The rack may be so halted by bottoming of the plunger of switch S29, or by contact with stop screw 84 (FIG. 2) suitably spaced above its single twist mode position.

Actuation of switch S29 triggers the spindle cylinder 64 to fully retract and (for example through deactuation of the mentioned relay) removes fluid pressure from stop and lock twist cylinders 261 and 273, which then spring retract. Stop cylinder retractions depresses switch SH6 with plate 267, disabling series connected switch SH2. Lock twist cylinder retraction actuates switch S32 which energizes spindle cylinder 64 to fully advance forward the carriage 57, fully releasing main clamp members 97 and resetting the shear blade 93A behind the wire path.

Substantially upon reaching its advanced position, the carriage 57, through its actuator 110, actuates switch S35 which momentarily advances, then permits spring return, of ejector cylinder 295. This shifts ejector block 297 (FIG. 8) downward, positively driving the balled end of product 14 downward off spindle pin 68. Ejector block 297 then returns upward to its solid line rest position shown and a pin 297A extending sidewardly therefrom lifts the downwardly angled actuator leaf 297B (FIGS. 1 and 8) of a limit switch S38 fixed to Table 220, actuating the latter.

Figure 9:
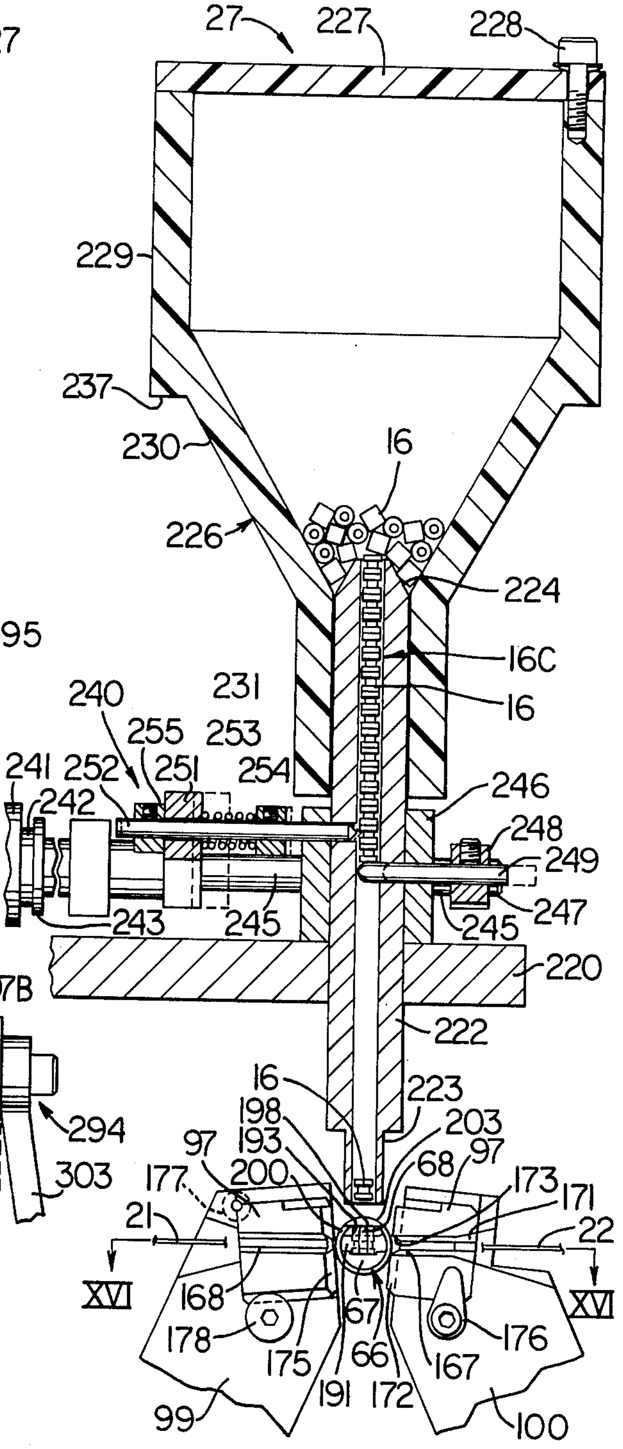
FIG. 9 is a fragmentary central cross-sectional view of the ball feed unit substantially taken on the line IX—IX of FIG. 8 and with the spindle in alternative rotative position for receiving a ball as in FIG. 8A.

Actuation of such switch S38 causes rack cylinder 77 to retract, dropping rack 79 and reverse rotating spindle 66 such that spindle pin 68 faces upward as in FIG. 9. As the rack 79 reaches its lowermost position it actuates switch S41, through actuator 108.

Actuated switch S41 momentarily advances, then permits spring return of, escapement cylinder 241, dropping the lowermost ball 16 in column 16C onto the upward facing spindle pin 68, by means of escapement 240. Upon such return, actuator leaf 243 trips switch SD2, releasing a signal usable to start a new cycle of operation, namely by de-energizing brake 35 and re-energizing clutch 36 (as through the mentioned conventional brake-clutch relay) to one again initiate feeding of wire past the ball just installed on spindle post 68.

A machine constructed according to the disclosed embodiment of the invention utilized limit switches (reference numerals starting with S) from Micro Switch Division of Honeywell of Freeport, Illinois, and each were adapted to emit a single pulse upon actuation by providing same with dischargeable capacitor units manufactured under the name "PULS-A-PAC" by Bellows-Valvair of Akron, Ohio. The several air cylinders were also obtained from Bellows. Where used, relays are obtainable from Potter and Brumfield of Princeton, Indiana. The magnetic clutch and brake are made by Warner Electric Clutch and Brake Company of Beloit, Wisconsin.

The above described actuation of the various pressure fluid cylinders by corresponding limit switches will be understood to be conventionally carried out, as through conventional solenoid valves not shown.

Although a particular preferred embodiment of the invention has been disclosed in detail for illustrative purposes, it will be recognized that variations or modifications of the disclosed apparatus, including the rearrangement of parts, lie within the scope of the present invention.

I claim:

1. A ball-ender apparatus for securing an annular ball to a wire musical instrument string, comprising:

a frame;

ball support means supported for rotation and reciprocation between front and rear positions with respect to said frame;

ball feed means fixed with respect to said frame and carrying a column of balls above the front position of said ball support means for dropping a said ball on the ball support means;

wire feed means positioned with respect to said frame for feeding a wire partially past said ball on said ball support means and means adjustably responsive to said feeding for determining the length of wire fed;

twist means engaging said ball support means for securing said ball in a loop of the fed wire length by selectably forming at least the first of first and second twist systems in the fed wire length at the ball;

means positioned with respect to said ball support means and wire feed means for ejecting the interconnected ball and wire length.

2. The apparatus of claim 1, in which said ball feed means includes a fixed delivery tube upstanding above said front position for containing a column of substantially vertically oriented annular balls, lower and upper pins transversely and alternatively insertable into the lower portion of said tube, respectively, said lower pin being insertable to support the lowermost ball in said column and retractable to drop said lowermost ball onto said ball support means while said upper pin blocks movement of the second lowermost ball in said column, a ball supply hopper movably mounted on said tube adjacent the upper end thereof, and means connected to said hopper for agitating the hopper for causing balls therein to sequentially enter the upper end of said tube.

3. The apparatus of claim 2, in which said ejecting means includes means guided on said hopper tube and responsive to said ball support means advancement for ejecting the interconnected ball and wire length from said ball support means, and means responsive to such ejection for returning said ball support means to its initial rotative condition as well as to cause said ball feed means to drop a further ball on said ball support means and initiate feeding a further wire length by said wire feed means.

4. The apparatus of claim 1, in which said wire feed means includes means on said frame for rotatably supporting an unwindable wire supply from which said wire is led along a path past the ball on said ball support means, wire drive means along said path and rotatable to advance said wire, a timing wheel frictionally driven by and adjustable radially of a rotating portion of said drive means for setting the length of wire fed, and switch means responsive to a rotation of said timing wheel to stop the wire drive means, said wire feed means further including tension control means intermediate said wire drive means and wire supply along said path, said tension control means including opposed fixed and shiftable wire support means with the wire traversing therebetween in a serpentine manner, means resiliently biasing said shiftable support means normally into braking engagement with said rotatable wire supply support means, wherein rotation of said wire drive means pulls wire from said serpentine, pulling said shiftable wire support means toward said fixed wire support means against said resilient bias and out of braking engagement with said rotatable wire supply support means.

5. The apparatus of claim 1, including carriage means retractable with respect to the frame for moving the ball support means rearwardly away from said wire path and including means operatively associated with said carriage means for cutting said wire upstream of said ball and bending said wire around said ball in a U-shape, clamp means including opposed side-by-side arms pivoted on a common, intermediate pivot axis fixed with respect to said frame and conical means responsive to carriage retraction for spreading opposed ends of said arms to effect clamping of the legs of with wire U-shape by the other arm ends.

6. The apparatus of claim 1, in which said twist means includes means responsive to said ball support means retraction for (1) forming the wire in a U-shape about the ball and (2) rotating said ball and thereby twisting the legs of the wire U-shape about each other to secure a ball at the end of said wire with a first twist and clamp means responsive to ball support means retraction for clamping the wire ahead of said ball while said first twist is formed, means responsive to rotation of said ball upon completion of said first twist for initiating a partial advancement and retraction of said ball support means and at least partially releasing said clamp means, and lock twist clamp means engageable with the wire ends extending from said first twist and responsive to continued rotation of said ball for forming a lock twist adjacent said first twist, means actuable in response to completion of said lock twist for disengaging said lock twist clamp means and fully advancing said ball support means.

7. The apparatus of claim 1, in which said ball support means includes a rearwardly extending ball support spindle, wire clamp means including spaced substantially parallel arms pivoted intermediate their ends on a common pivot axis disposed therebetween, clamp members on opposed upper ends of said arms intermediately behind said wire path, said spindle extending between said clamp members and being retractable rearwardly of said clamp members to pull the adjacent wire into U-shape between said clamp members, a disk rotatably supported on said frame between the other ends of said arms, means responsive to rearward shifting of said spindle for rotating said disk, conical bosses fixed to opposite sides of said disk and engageable with said other arm ends for spreading same apart upon such rearward spindle movement and thereby for bringing said clamp members together in clamping relation on said wire ends;

means operatively associated with said spindle for rotating said spindle, ball and wire U-shape with respect to clamp means after said rearward spindle movement for twisting together the wire portions of said U-shape and thereby to secure said wire length to said ball with a first twist.

8. The apparatus of claim 7, including lock twist means adjacent said front position for applying a lock twist to said wire ends upon completion of said first twist and including lock twist jaw means advanceable into engagement with said wire ends immediately forward of said clamp members, holding means flush with said arms and clamp members for securing at least one said clamp members to its corresponding arm behind said lock twist jaw means so as to permit placement of said lock twist jaw means forward of last-mentioned clamp member with minimum spacing between.

9. The apparatus of claim 7, in which said clamp members each have a wire groove in the front face thereof, the upstream clamp member having a beveled lip extending downstream the front face thereof and said downstream clamp member having a correspondingly beveled upstream front edge to be overlaid by said lip with said clamp members approaching wire clamping relation, said grooves communicating through said beveled lip and beveled edge.

10. The apparatus of claim 1, in which said spindle has a diametral ball receiving pin, and including thrust bearing means slidable on said spindle and spring means on said spindle urging said thrust bearing means continuously against the back of said clamp arms, tab means extending fixedly and forwardly from said thrust bearing means for covering said pin to prevent loss of a ball therefrom with said spindle in the rear portion of its travel.

11. A ball-ender apparatus for securing an annular ball to a wire musical instrument string, comprising:

a frame;

ball support means rotatable, and reciprocable between front and rear positions, with respect to said frame;

a fixed delivery tube upstanding above the front ball support means for slidably containing a column of substantially vertically oriented annular balls;

coupled lower and spring loaded upper pins transversely and alternatively insertable into the lower portion of said tube, such that said lower pin normally extends into said tube for supporting the lowermost ball in said column and said upper pin normally is withdrawn from the interior of said tube;

pin drive means coupled with said pins for (1) retracting said lower pin to drop the lowermost ball from said tube onto said ball support means and (2) therewith resiliently urging said upper pin against the second lowermost ball in said column for retaining said column in said tube;

a ball supply hopper movably mounted on the upper end of said tube and adapted to contain a supply of balls overlying the upper tube end;

motor means operatively connected with said hopper for vertically agitating said hopper on said tube to add balls from the hopper to said column in said tube;

feed means positioned with respect to said frame for advancing a preselected length wire partially past the ball and said ball support means;

twist means coupled with the ball support means for twisting the adjacent end of said wire length to close a loop of said wire around said ball;

means positioned with respect to said frame for ejecting the interconnected ball and wire length.

12. The apparatus of claim 11, in which said hopper has an annular downwardly facing surface at its periphery, said motor means including an eccentric engaging and underlying said annular hopper surface and rotatable by a motor fixed with respect to said frame for rotating and vertically reciprocating said hopper on said tube, the open upper end of said tube being tapered to facilitate its penetration of the mass of balls in said reciprocating hopper, the bore of said tube being sized to snugly but freely slidably receive balls coaxially therein.

13. The apparatus of claim 11, including a pressure fluid cylinder fixed with respect to said frame and having plunger means reciprocable thereby tangentially of said tube below said hopper, first and second legs fixed transversely on said plunger means at opposite sides of said tube, said lower pin being fixed to said first leg and extending therefrom parallel to said plunger means diametrally into said tube, said upper pin being slidably carried by said second leg parallel to said plunger means and diametrally of said tube, and including spring means resiliently biasing said upper pin away from said second leg and toward the interior of said tube and means limiting movement of said upper pin with respect to said second leg in the direction of said tube for permitting withdrawal of said upper pin from said tube interior by said plunger means when the latter moves the lower pin into the tube bore.

14. The apparatus of claim 13, in which said pressure fluid cylinder is momentarily actuable for withdrawing said lower pin and engaging said upper pin to drop a single ball onto said ball support means, means responsive to operation of said ejecting means for actuating said pressure fluid cylinder, means engaged by said plunger means and responsive to actuation of said pressure fluid cylinder for again actuating said wire feed means to supply a second preselected length of wire for a second ball-ending operation.

15. The apparatus of claim 13, in which said ball support means comprises a rearwardly extending shaft having a tapered upstanding pin on the forward end thereof, said pin in its forward position being coaxially aligned below said tube, the base of said pin being spaced below the bottom of said tube by a dimension slightly exceeding the height of two stacked balls, the height of said pin approximating the height of one ball.

16. The apparatus of claim 11, in which said ejecting means includes a block extending forward from and having a rear end slidably engaging and guided on the lower portion of said tube, said ball support means comprising a shaft having a pin in its forward end alignable coaxially below said tube for receiving a said annular ball prior to twisting, said twist means including means operatively associated with said shaft for rotating said shaft to effect said wire twisting and arranged to leave said pin downwardly facing below said tube when twisting is completed, said block being downwardly slidable along said tube into engagement with the twisted portion of said wire immediately adjacent said ball to push the ball-ended wire off said downwardly extending pin.

17. The apparatus of claim 16, including an ejector pressure fluid cylinder fixed with respect to said frame above said block and having a downwardly extending plunger fixed to said block and actuable to effect a downward ejection stroke of said block followed by an upward return of said block, means responsive to forward movement of said shaft and pin into position below said hopper tube for actuating said ejector cylinder, means actuable by said ejector cylinder plunger for causing said twist means to rotatably return said pin to an upwardly facing position after such ejection and for then causing said ball feed means to drop another ball onto said pin preparatory to a new cycle of apparatus operation.

18. The apparatus of claim 7, including a pair of side-by-side substantially L-shaped rods positioned with respect to said frame, said rods having adjacent first legs vertically spaced for loosely receiving the leading end of the wire fed by said wire feed means and being offset downstream along the wire path from said ball support means, wherein the leading, longer end of the wire can swing forward along and between said first rod legs to a forwardly extending position in response to rearward shifting of said ball support means, said L-shaped rods each having a second leg connected by a bend to its said first leg and sloping downwardly across and in forwardly spaced relation from said ball support means, said second rod legs being substantially horizontally spaced from each other by more than the wire twist diameter but less than the smallest dimension of said ball for slidably supporting said ball with the interconnected length of wire depending therefrom between said second rod legs following said ejection from the ball support means.

19. A ball-ender apparatus for securing an annular ball to a wire musical instrument string, comprising:

a frame;

ball support means carried by said frame and ball feed means opposed to said ball support means for applying an annular ball to the ball support means;

means on said frame for rotatably supporting an unwindable wire supply from which said wire is lead along a path past a said ball on said ball support means;

wire drive means on said frame at said path and rotatable by motor means to advance said wire;

means on said path adjacent said wire supply for limiting tension on said wire during wire advancement by said wire drive means;

a freely rotatable timing wheel, said wire drive means including a member rotatable with advancement of said wire and with an angular rotation proportional to the length of wire advanced, said rotatable member frictionally engaging said timing wheel in edge to face contact for rotationally driving said timing wheel proportionally to the length of wire advanced;

means locating said timing wheel on said frame and adjustable for shifting said timing wheel with respect to said rotating member to change the angular displacement ratio therof and thus the length of wire advanced per rotation of said rotatable timing wheel, and switch means actuable by said timing wheel following a fixed angular displacement thereof to deactuate said motor means for stopping wire advancement;

means coupled with said ball support means for twisting the adjacent end of the fed wire length to close a loop around said ball;

means positioned with respect to said frame for ejecting the interconnected ball and wire length from the apparatus.

20. The apparatus of claim 19, in which said wire drive means includes at least one pair of drive wheels frictionally engaging said wire therebetween and rotatable for advancing such wire, rotational power transfer means positively and rotatably interconnecting said motor means, rotatable member and drive wheels for synchronous rotation, said rotatable member being substantially disclike and having an end face frictionally engaging the timing wheel periphery, the axes of said timing wheel and rotatable member being perpendicular, means fixing the axis of said timing wheel with respect to said frame, said adjustable locating means being actuable for axially shifting said timing wheel to radially shift its contact on said rotatable member and thus vary the length of wire fed for one timing wheel rotation, said timing wheel including an actuator member protruding from one peripheral portion thereof and engageable with said switch means upon completion of one rotation of said timing wheel for actuating said switch means.

21. Apparatus of claim 19, including a substantially L-shaped cross section wire deflection plate downstream along the path of said wire from said ball support means, said plate comprising a substantially horizontal and tablelike portion adapted to receive said wire theretop and an upstanding but somewhat forwardly angled flange portion joined to said tablelike portion in a bend zone, said bend zone having an inner end substantially on the wire path for receiving the leading end of said wire and having an outer end angled somewhat forwardly to forwardly angle the leading end of said wire as it moves therepast, rearward movement of a ball with said support means rearwardly pushing the wire and bending same into a U-shape, said L-shaped cross section plate supporting said wire and permitting same to sweep thereacross away from said bend zone during the formation of said U-shape, a pair of rods at the inboard end of said horizontal plate portion and vertically spaced sufficient to receive the advancing wire end therethrough, said rods having outer ends bent into a plane substantially parallel to the wire feed path and angled downwardly therein in forwardly spaced relation from said ball support means and wire path for constraining the leading portion of the wire therein during said formation of said U-shape.

22. The apparatus of claim 19, including a vertically opposed pair of wire flattening rolls having axes transverse to the wire path and between which said wire passes from said supply to said wire drive means, one of said rolls being mounted for rotation with respect to said frame on an eccentric having means adjustable for fixing said eccentric to said frame but releasable for rotatably adjusting said eccentric with respect to said frame, to adjust the spacing between said rollers and hence the degree to which same flatten wire passing therebetween.

23. A ball-ender apparatus for securing an annular ball to a wire musical instrument string, comprising:

a frame;

ball support means carried by said frame;

ball feed means adjacent said ball support means for applying an annular ball to said ball support means;

wire drive means positioned with respect to said frame and actuable for feeding a preselected length of wire by friction engagement therewith;

support means on said frame for rotatably supporting an unwindable wire supply from which said wire is led along a path through said wire drive means for advancement past a ball on said ball support means;

a fixed wire support arm extending from said frame and spaced from said wire supply support means;

a pivoted wire support arm pivoted with respect to said frame and extending in spaced relation along said fixed arm, said pivoted arm carrying a braking member engageable with a rotatable braking portion of said wire supply support means and resilient means interconnecting said pivotable arm and frame for urging apart said arms and urging together said braking member and said rotatable braking portion so that wire can be pulled directly from said wire supply only under relatively high tension;

plural pulley means on said fixed and pivoted arms between which said wire extends in a serpentine between said wire supply and said wire drive means, said pivotable arm being resiliently urged away from said fixed arm into normal braking engagement with said wire supply support means portion but upon tensioning of said wire in said serpentine with a relatively light tension, wherein initial wire advancement by said wire drive means pulls wire from said serpentine at low tension, said pivoted arm is pivoted toward said fixed arm to reduce the width of said serpentine, sufficient movement of the pivoted arm releasing said braking of said wire supply means permitting withdrawal of wire therefrom substantially at said low tension;

means operatively connected with said ball support means for twisting the trailing end of the advanced wire length to secure same in a looped manner around said ball.

24. A ball-ender apparatus for securing an annular ball to a wire musical instrument string, comprising:

a frame;

ball support means including a spindle supported for rotation and for reciprocation between front and rear positions with respect to said frame;

ball feed means on said frame for applying an annular ball to said spindle at the front spindle position;

wire feed means adjacent said ball support means for supplying a preselected length wire partially past said ball on said ball support means;

first twist means operatively connected with said ball support means for twisting one end portion of a severed length wire to form a closed loop secured around said ball leaving long and short wire ends extending forward beyond said first twist;

lock twist clamp means shiftable into engagement with said wire ends adjacent and forward of said ball support means, said spindle extending rearwardly away from said lock twist clamp means;

stop means positionable with respect to said frame in response to operation of said first twist means for limiting advancement of said spindle from its rear position and means operatively connected with said spindle and responsive to completion of said first twist for forwarding said spindle to the extent permitted by said stop means, said lock twist clamp means including jaw means radially confining said wire ends during said limited advancement and responsive to spindle rotation for tightly twisting the short wire end around the long wire end adjacent said first twist for forming a lock twist precluding unraveling of said first twist upon subsequent tensioning of said wire between the balled and unballed ends thereof;

means operatively connected to said stop means and lock twist clamp means and responsive to sufficient rotation of said spindle to complete said lock twist for retracting said stop means and said lock twist clamp means to out-of-the-way rest positions and said means operatively connected to said spindle also being responsive to such retraction for causing a full forward advancement of said spindle;

means positioned with respect to said frame and responsive to such forwardly for ejecting the interconnected ball and wire length from said spindle.

25. The apparatus of claim 24, including reciprocable shaft means supporting said lock twist jaw means for advancement to and retraction from a position in front of said spindle, said jaw means having a front facing slot of width slightly exceeding the wire diameter but less than two wire diameters for receiving the wire ends extending from said first twist slidably therein in side-by-side relation, said jaw means having a rear facing recess communicating with said slot and of width slightly exceeding three wire diameters but less than four, rotation of said spindle drawing the short wire end rearwardly through said slot while wrapping same within said recess about said long wire end to form an axially tight lock twist.

26. The apparatus of claim 24 including a carriage supporting said spindle for rotation with respect thereto and shiftable forward and rearward on said frame to correspondingly shift said spindle, said stop means comprising a stop pressure fluid cylinder fixed on said frame and a stop block advanceable by said stop cylinder into the path of the carriage for blocking full forward carriage movement, said carriage being forwardly and rearwardly movable by actuation of a spindle pressure fluid cylinder, said lock twist clamp means including a lock twist pressure fluid cylinder actuable for advancing and retracting said lock twist jaw means, said means responsive to completion of the lock twist including first switch means actuable in response to completion of rotation of said spindle, corresponding to completion of said lock twist, for retracting said spindle cylinder, stop cylinder and lock twist cylinder, said means responsive to retraction of said stop and lock twist clamp means including second switch means actuable by retraction of said lock twist cylinder for causing full forward advancement of said carriage by said spindle cylinder, said means responsive to forwarding of said spindle comprising third switch means actuable by said carriage during such forward advancement and an ejection pressure fluid cylinder responsive to actuation of said third switch means for removing the interconnected ball and wire from said spindle.

27. The apparatus of claim 24, including rack pressure fluid cylinder means actuable for rotating said spindle, spindle pressure fluid cylinder means actuable for forwardly and rearwardly shifting said spindle, said stop means comprising a stop block and a stop pressure fluid cylinder means actuable for inserting said stop block in the path of forward advancement of said spindle, first switch means responsive to an initial rearward shifting of said spindle by said spindle pressure fluid cylinder means for actuating said stop cylinder means, second switch means responsive to advancement of said stop cylinder means for actuating said rack cylinder means and thereby rotating said spindle for achieving said first twist, third switch means responsive to said stop cylinder means actuation and to positioning of said rack cylinder means at the end of said first twist for actuating said spindle cylinder means to advance said spindle to the extent permitted by said stop block and then to continue actuation of said rack cylinder means and rotation of said spindle for forming said lock twist.

* * * * *

UNITED STATES PATENT AND TRADEMARK OFFICE

CERTIFICATE OF CORRECTION

PATENT NO. : 4 034 456

DATED July 12, 1977

INVENTOR(S) : Robert H. Bowers

It is certified that error appears in the above-identified patent and that said Letters Patent are hereby corrected as shown below:

Column 20, line 27; change "with" to ---the---.

Column 26, line 8; Change "forwardly" to ---forwarding---.

Signed and Sealed this

*Twenty-seventh* Day of *September 1977*

[SEAL]

*Attest:*

RUTH C. MASON
*Attesting Officer*

LUTRELLE F. PARKER
*Acting Commissioner of Patents and Trademarks*